(12) United States Patent
Moriguchi

(10) Patent No.: US 7,529,604 B2
(45) Date of Patent: May 5, 2009

(54) MOVING BODY SYSTEM AND MOVING BODY

(75) Inventor: Toshiki Moriguchi, Nagaokakyo (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 743 days.

(21) Appl. No.: 10/866,684

(22) Filed: Jun. 15, 2004

(65) Prior Publication Data
US 2005/0021196 A1 Jan. 27, 2005

(30) Foreign Application Priority Data
Jul. 23, 2003 (JP) ............................. 2003-278633
Jul. 23, 2003 (JP) ............................. 2003-278634
Jul. 23, 2003 (JP) ............................. 2003-278635

(51) Int. Cl.
*B60T 8/32* (2006.01)

(52) U.S. Cl. ............................. 701/23; 701/24; 180/169; 318/568.12

(58) Field of Classification Search ................. 701/23; 180/169; 318/568.12
See application file for complete search history.

(56) References Cited

U.S. PATENT DOCUMENTS

| | | | |
|---|---|---|---|
| 1,517,549 A | 12/1924 | Espenschied | |
| 3,784,791 A * | 1/1974 | Pease | ........................... 235/454 |
| 4,207,569 A | 6/1980 | Meyer | |
| 4,380,135 A * | 4/1983 | Wildman et al. | ............ 446/433 |
| 4,510,565 A | 4/1985 | Dummermuth | |
| 4,519,140 A | 5/1985 | Schmitt et al. | |
| 4,846,297 A * | 7/1989 | Field et al. | ................... 180/169 |
| 4,846,298 A | 7/1989 | Naito | |

(Continued)

FOREIGN PATENT DOCUMENTS

EP 0 211 327 A 2/1987

(Continued)

OTHER PUBLICATIONS

Japanese Office Action dated Mar. 6, 2007 (mailing date), issued in corresponding Japanese Patent Application No. 2003-278634.

(Continued)

*Primary Examiner*—Thomas G. Black
*Assistant Examiner*—Wae Louie
(74) *Attorney, Agent, or Firm*—Westerman, Hattori, Daniels & Adrian, LLP.

(57) ABSTRACT

It is an object of the present invention to provide a moving body system which can determine a moved position of a moving body such as a guided vehicle or a stacker crane wherever it is on a moving path, which can stop the moving body anywhere, and which can quickly move the moving body to a stopped position. The present invention provides a moving body system including a guided vehicle 1 moving along running rails 2, 2 constituting a moving path and a detected member 20 laid along the running rails 2, 2. The detected member 20 includes a large number of mark members 21, 21, ... in a direction in which the guided vehicle 1 moves. The guided vehicle 1 includes a first detecting sensor 11 and a second detecting sensor 12 which detect the mark members 21, 21, ... of the detected member 20.

9 Claims, 13 Drawing Sheets

U.S. PATENT DOCUMENTS

| | | | |
|---|---|---|---|
| 4,870,592 A | 9/1989 | Lampi et al. | |
| 4,969,713 A | 11/1990 | Wyckoff | |
| 5,010,974 A | 4/1991 | Matsuda | |
| 5,056,437 A * | 10/1991 | Maddock | 104/88.03 |
| 5,138,560 A * | 8/1992 | Lanfer et al. | 235/454 |
| 5,235,181 A | 8/1993 | Durana et al. | |
| 5,279,672 A * | 1/1994 | Betker et al. | 134/18 |
| 5,511,005 A | 4/1996 | Abbe et al. | |
| 5,511,896 A | 4/1996 | Marcato | |
| 5,579,857 A * | 12/1996 | Abe et al. | 180/8.2 |
| 5,638,268 A | 6/1997 | Souza | |
| 5,713,540 A | 2/1998 | Gerszberg et al. | |
| 5,743,495 A | 4/1998 | Welles et al. | |
| 5,781,451 A | 7/1998 | Lofthus et al. | |
| 5,839,084 A * | 11/1998 | Takasaki et al. | 701/67 |
| 6,192,294 B1 | 2/2001 | Chiba | |
| 6,305,760 B1 * | 10/2001 | Otake | 303/122.05 |
| 6,374,748 B1 | 4/2002 | Shiwaku et al. | |
| 6,409,451 B1 | 6/2002 | Fallin et al. | |
| 6,452,158 B1 * | 9/2002 | Whatley et al. | 250/231.13 |
| 6,453,228 B1 * | 9/2002 | Shimada | 701/89 |
| 6,479,906 B2 * | 11/2002 | Uchida | 290/40 C |
| 6,510,365 B1 | 1/2003 | Nishinakayama et al. | |
| 6,535,790 B2 | 3/2003 | Nakano et al. | |
| 6,543,591 B2 | 4/2003 | Kuzuya | |
| 6,547,022 B2 * | 4/2003 | Hosomi et al. | 180/197 |
| 6,606,549 B1 * | 8/2003 | Murakami et al. | 701/89 |
| 6,644,208 B2 | 11/2003 | Akiyama | |
| 6,987,465 B2 * | 1/2006 | Mittmann | 341/15 |
| 7,034,283 B2 * | 4/2006 | Williams et al. | 250/231.16 |
| 7,134,517 B1 * | 11/2006 | Kaiser et al. | 180/65.6 |
| 2002/0021955 A1 | 2/2002 | Kawaguchi | |
| 2002/0033319 A1 | 3/2002 | Fukushima | |
| 2002/0055789 A1 | 5/2002 | Ben-Exra et al. | |
| 2002/0104726 A1 | 8/2002 | Kuzuya | |
| 2002/0154974 A1 | 10/2002 | Fukuda et al. | |
| 2002/0157562 A1 | 10/2002 | Akiyama | |
| 2003/0023343 A1 | 1/2003 | Tomita et al. | |
| 2003/0229416 A1 | 12/2003 | Tai et al. | |
| 2005/0021196 A1 * | 1/2005 | Moriguchi | 701/23 |
| 2007/0114080 A1 * | 5/2007 | Kaiser et al. | 180/65.1 |

FOREIGN PATENT DOCUMENTS

| | | |
|---|---|---|
| EP | 0 472 028 A2 | 2/1992 |
| EP | 0 937 965 A | 8/1999 |
| GB | 2 221 758 A | 2/1990 |
| JP | 57-81003 | 5/1982 |
| JP | 57-81006 | 5/1982 |
| JP | 60-73304 U | 5/1985 |
| JP | 61 260103 A | 11/1986 |
| JP | 63016209 A | 1/1988 |
| JP | 63-180521 A | 7/1988 |
| JP | 63231211 A | 9/1988 |
| JP | 01077401 A | 3/1989 |
| JP | 01-231610 A | 9/1989 |
| JP | 05-142241 A | 6/1993 |
| JP | 05 297010 A | 11/1993 |
| JP | 06-107178 A | 4/1994 |
| JP | 07-177610 A | 7/1995 |
| JP | 07-213095 A | 8/1995 |
| JP | 09-140003 A | 5/1997 |
| JP | 10-014287 A | 1/1998 |
| JP | 11243604 A | 9/1999 |
| JP | 2000-050421 A | 2/2000 |
| JP | 2000-209705 A | 7/2000 |
| JP | 2001240213 A | 9/2001 |
| JP | 2002-351541 | 12/2002 |

OTHER PUBLICATIONS

Japanese Office Action dated Apr. 17, 2007 (mailing date), issued in corresponding Japanese Patent Application No. 2003-278635.

European Search Report dated Mar. 27, 2007, issued in corresponding European Patent Application No. 07 00 2299.

English translation of Notification of Reason(s) for Refusal of the Japanese Patent Application No. 2003-278635, dated Jan. 8, 2008, from the Japanese Patent Office.

* cited by examiner

MOVING BODY SYSTEM AND MOVING BODY

FIELD OF THE INVENTION

The present invention relates to a moving body system that moves a moving body along a moving path.

BACKGROUND OF THE INVENTION

An automated guided vehicle system is known which is used in a semiconductor manufacturing plant or the like and which comprises a moving path laid along processing devices or the like and on which an automated guided vehicle automatically runs. The automated guided vehicle conveys work pieces. The automated guided vehicle system is desired to accurately stop the automated guided vehicle in front of a processing device. The automated guided vehicle is configured as described below.

FIG. 9 is a diagram schematically showing the configuration of a conventional automated guided vehicle system. Processing devices 104, 104, . . . are arranged along a running path 102 for an automated guided vehicle (hereinafter referred to as "guided vehicle") 101. Stop position markers 120 are applied to positions at which the guided vehicle 101 is to be stopped, such as the processing devices 104, 104, . . . The guided vehicle 101 is provided with a marker detecting sensor 115 that detects the stop position markers 120.

When a destination (a processing device 104 or the like) is specified, a running program in which timings for acceleration and deceleration and the like are written is created for the guided vehicle 101. Then, the running of the guided vehicle 101 is controlled in accordance with the running program. The guided vehicle 101 is provided with an encoder on a rotating shaft of wheels. Output pulses from the encoder are counted to accumulate the distance that the guided vehicle 101 has run. When nearing the target processing device 104, the guided vehicle 101 starts to be decelerated (see FIG. 9A). The speed is sufficiently reduced, so that the guided vehicle 101 runs at an about-to-stop speed at which it can be immediately stopped at any time (see FIG. 9B). When the marker detecting sensor 115 detects the tip of the stop position marker 120 at the destination (see FIG. 9C), the output pulses from the encoder newly start to be counted. When the marker detecting sensor 115 reaches the center of the stop position marker 120 in its longitudinal direction, the wheels of the guided vehicle 101 are stopped (see FIG. 9D). The stop of the guided vehicle 101 is controlled as described above so that the guided vehicle 101 can be accurately stopped at the destination.

However, during running, the wheels of the guided vehicle 101 may slip on the running path 102. In particular, a slip is likely to occur while the guided vehicle 101 is being accelerated or decelerated. If such a slip occurs, there may be a difference between the running distance obtained by accumulating the output pulses from the encoder and an actual running distance. As a result, the guided vehicle 101 may start to decelerate earlier than scheduled and reach the about-to-stop speed in front of and relatively away from the destination. Then, the guided vehicle 101 carries out creep running at the about-to-stop speed until it reaches the destination. However, such an approach to the destination takes a very long time. Thus, the conventional system disadvantageously suffers a heavy time loss and fails to perform operations easily and efficiently.

In view of these points, the Unexamined Japanese Patent Application Publication (Tokkai) 2002-351541 discloses an automated guided vehicle improved as described below. As shown in FIG. 10, a large number of markers 220, 220, . . . are applied along a running path 202 for the guided vehicle 201. The markers 220, 220, . . . are applied not only to positions corresponding to the processing devices 204, 204, . . . but also to the positions between the processing device 204 and the processing device 204. The guided vehicle 201 is provided with a marker detecting sensor 215 to detect the markers 220. The speed of the guided vehicle 201 is controlled in accordance with the running path 202 until the marker 220 located at a position 207 immediately in front of a target stopped position 208 is reached. Between the stopped position 208 and the position 207 immediately in front of the stopped position 208, the speed and the deceleration start position are controlled on the basis of the distance to the stopped position 208.

When a destination (a processing device 204 or the like) is specified, the guided vehicle 201 runs at a speed specified by a running program until the marker 220 located at the position 207 immediately in front of the stopped position 208 corresponding to the destination is detected. As shown in FIG. 10A, when the marker detecting sensor 215 of the guided vehicle 201 detects the terminal of the marker 220 located at the position 207 immediately in front of the target stopped position 208, a pulse count value from an encoder provided on a rotating shaft of wheels of the guided vehicle 201 is preset to 0 (zero). That is, the terminal of the marker 220 is used as a reference position for the pulse count from the encoder. Then, the speed is controlled by counting output pulses from the encoder to accumulate the running distance of the guided vehicle 201 from the terminal of the marker 220 located at the position 207 immediately in front of the stopped position 208. When the guided vehicle 201 reaches a preset deceleration start position, deceleration control is performed to obtain a predetermined deceleration in order to accurately stop the vehicle at the stopped position 208.

As shown in FIG. 10B, the guided vehicle 201 nears the target stopped position 208 and detects the marker 220 provided at the stopped position 208. Then, the pulse count value from the encoder is preset again. The stop control of the guided vehicle 201 starts to be performed when the tip of the marker 220 located at the stopped position 208 is detected. The counting of pulses from the encoder is newly started at the tip of the marker 220 located at the stopped position 208. The running speed of the guided vehicle 201 is controlled to further decrease by accumulating the running distance. Then, as shown in FIG. 10C, the wheels of the guided vehicle 201 are stopped at the position at which the marker detecting sensor 215 detects the terminal of the marker 220 located at the stopped position 208. Consequently, the guided vehicle 201 is accurately stopped at the stopped position 208.

With the latter conventional technique (the Unexamined Japanese Patent Application Publication (Tokkai) 2002-351541), there is only a short distance between the stopped position 208 and the position 207 immediately in front of the stopped position 208. Accordingly, between the stopped position 208 and the position 207 immediately in front of the stopped position 208, there is only a small difference between the actual running distance and the running distance obtained by accumulating the output pulses from the encoder after the detection of the terminal of the marker 220 located at the position 207 immediately in front of the stopped position 208. This technique also substantially prevents the approach to the destination from disadvantageously requiring a long time as a result of the premature start of deceleration, which may occur with the former conventional technique. With the latter conventional technique, the guided vehicle 201 moves quickly between the stopped position 208 and the position 207 immediately in front of the stopped position 208. Furthermore, the guided vehicle 201 can be accurately stopped at the stopped position 208.

However, such stop control can be performed only on the stopped positions 208, 208, . . . If the guided vehicle 201 is stopped in a different place, problems similar to those with the former conventional technique may occur. Moreover, when the layout of the automated guided system is changed or new facilities are added, the markers 220, 220, . . . must be reapplied to desired positions in the changed system. Then, the guided vehicle 201 must be taught to stop at the positions of the reapplied markers 220, 220, . . . Subsequently, the guided vehicle 201 must be experimentally run to check whether or not it accurately stops at the positions of the markers 220, 220, . . . This checking operation requires much time and effort and is cumbersome. The prior art should also be improved in this point.

In view of these points, it is an object of the present invention to provide a moving body system which can determine a moved position of a moving body such as a guided vehicle or a stacker crane wherever it is on a moving path, which can stop the moving body anywhere, and which can quickly move the moving body to a stopped position.

SUMMARY OF THE INVENTION

The problems to be solved by the present invention have been described. Now, description will be given of means for solving the problems.

First, as set forth in claim 1, there is provided a moving body system comprising a moving body that moves along a moving path and a detected member laid along the moving path, the system being characterized in that the detected member comprises a large number of mark members in a direction in which the moving body moves, and the moving body comprises detecting means for detecting the mark members of the detected member.

Further, as set forth in claim 2, each of the mark members comprises a detected portion that can be detected by the detecting means a non-detected portion that is not detected by the detecting means.

As set forth in claim 3, the detected member is configured like comb teeth in which a comb tooth portion is the detected portion, while a void between the comb teeth is the non-detected portion.

As set forth in claim 4, in the moving direction of the moving body, the width of the detected portion is equal to the width of the non-detected portion.

As set forth in claim 5, the detecting means comprises first detecting means and second detecting means which are arranged in the moving direction of the moving body.

As set forth in claim 6, a spacing W between the first detecting means and the second detecting means and the width D of the detected portion of the detected member in the moving direction of the moving body are configured in accordance with the following relation:

$$W = (2n+1/2)D \ (n=0, 1, 2, \ldots)$$

As set forth in claim 7, the moving body system further comprises a plurality of detected members arranged in parallel along the moving path of the moving body and in that the moving body is provided with sensing means for sensing the detected member.

As set forth in claim 8, the detected member has positional information, and the sensing means is configured to read the positional information from the detected member.

As set forth in claim 9, the moving body comprises an encoder that measures a moved distance and control means for controlling a moving speed of the moving body until the mark member located immediately in front of a stop target position is reached, by using the detecting means to detect the mark members of the detected member to determine a moved position of the moving body, and then using the encoder to measure the moved distance of the moving body from the mark member located immediately in front of the stop target position before stopping the moving body at the stop target position.

As set forth in claim 9, the control means resets the measurement of the moved distance by the encoder to an origin every time the detecting means detects a detection point on the mark member of the detected member.

First, according to an aspect of the invention set forth in claim 1, the moving body uses the detecting means to detect the mark members of the detected member, laid along the moving path. Accordingly, the moved position of the moving body can be substantially accurately determined wherever the moving body is on the moving path. As a result, the following situation is avoided: there occurs a difference between the actual moving distance and the moving distance determined by the moving body, so that deceleration is started earlier than scheduled and the moving body starts to run at an about-to-stop speed in front of and relatively away from the stopped position. This aspect also enables the moving body to move quickly to the stopped position. Therefore, operations can be performed more easily and efficiently.

Further, according to an aspect of the invention set forth in claim 2, the moving body uses the detecting means to detect the detected portion or non-detected portion of the mark member of the detected member. Accordingly, the moved position can be substantially accurately determined wherever the moving body is on the moving path. As a result, the following situation is avoided: there occurs a difference between the actual moving distance and the moving distance determined by the moving body, so that deceleration is started earlier than scheduled and the moving body starts to run at an about-to-stop speed in front of and relatively away from the stopped position. This aspect also enables the moving body to move quickly to the stopped position. Therefore, operations can be performed more easily and efficiently.

According to an aspect of the invention set forth in claim 3, the detected member is configured like comb teeth. This eliminates the need for time and effort to, for example, arrange detected portions one by one. The moving body uses the detecting means to detect the comb tooth portion of the comb teeth-shaped detected member or the void between the comb teeth. Accordingly, the moved position can be substantially accurately determined wherever the moving body is on the moving path. As a result, the following situation is avoided: there occurs a difference between the actual moving distance and the moving distance determined by the moving body, so that deceleration is started earlier than scheduled and the moving body starts to run at an about-to-stop speed in front of and relatively away from the stopped position. This aspect also enables the moving body to move quickly to the stopped position. Therefore, operations can be performed more easily and efficiently.

According to an aspect of the invention set forth in claim 4, the distance form an ON signal outputted by the detecting means upon detecting one end of the detected portion to an OFF signal outputted by the detecting means upon detecting the other end of the detected portion (one end of the non-detected portion) is the same as the distance from an OFF signal outputted by the detecting means upon detecting the other end of the detected portion (one end of the non-detected portion) to an ON signal outputted by the detecting means upon detecting one end of the adjacent detected portion (other end of the non-detected portion). Thus, simply by counting the number of ON and OFF signals, it is possible to determine the moving distance. This simplifies a control arrangement for counting the moving distance.

According to an aspect of the invention set forth in claim 5, the mark members of the detected member are detected using the first and second detecting means, arranged in parallel in the moving direction of the moving body. Accordingly, the moved position can be substantially accurately determined wherever the moving body is on the moving path. For the moving direction of the moving body, if the first detecting means detects a certain detected portion (or non-detected portion) on the detected member earlier than the second detecting means, then it is recognized that the moving body is moving forward. In contrast, if the second detecting means detects a certain detected portion (or non-detected portion) on the detected member earlier than the first detecting means, then it is recognized that the moving body is moving backward.

According to an aspect of the invention set forth in claim 6, for each mark member, four points including the opposite ends and center of the detected portion and the center of the detected portion can be controlled as detection points. Each mark member is divided into four pieces to enable the moved position to be more precisely determined. Further, the mark member may be divided into four or two pieces or may be undivided depending on applications. The four detection points are spaced at equal intervals. This simplifies the control arrangement for counting the moving distance.

According to an aspect of the invention set forth in claim 7, the sensing means of the moving body detects the sensed members to check whether or not the detecting means has failed to read any of the sensed members. If the detecting means has failed to read any of the sensed members, adequate corrections are made to make the system more reliable.

According to an aspect of the invention set forth in claim 8, the sensing means of the moving body detects positional information on the sensed members to check whether or not the detecting means has failed to read any of the sensed members. If the detecting means has failed to read any of the sensed members, adequate corrections are made to make the system more reliable.

According to an aspect of the invention set forth in claim 9, the moving body roughly determines the moved position by using the detecting means to detect the mark members of the detected member until the mark member located immediately in front of the stop target position is reached. Then, the moving body uses the encoder to measure the moving distance from the mark member located immediately in front of the stop target position before accurately stopping at the stop target position. This arrangement prevents the following situation: there occurs a difference between the actual moving distance and the moving distance determined by the moving body, so that deceleration is started earlier than scheduled and the moving body starts to run at an about-to-stop speed in front of and relatively away from the stopped position. This arrangement also enables the moving body to move quickly to the stopped position. Therefore, operations can be performed more easily and efficiently. Further, this arrangement enables the moving body to be stopped anywhere on the moving path. This makes the system more versatile.

According to an aspect of the invention set forth in claim 9, the control means resets the measurement of the moving distance by the encoder to the origin every time the detecting means detects the detection point on the mark member of the detected member. Accordingly, the moving distance can be measured without any errors, thus making the system more reliable.

DETAILED DESCRIPTION OF THE PREFERRED EMBODIMENTS

A description will be given of an automated guided vehicle system as an example of a moving body system according to the present invention.

Figure 1:
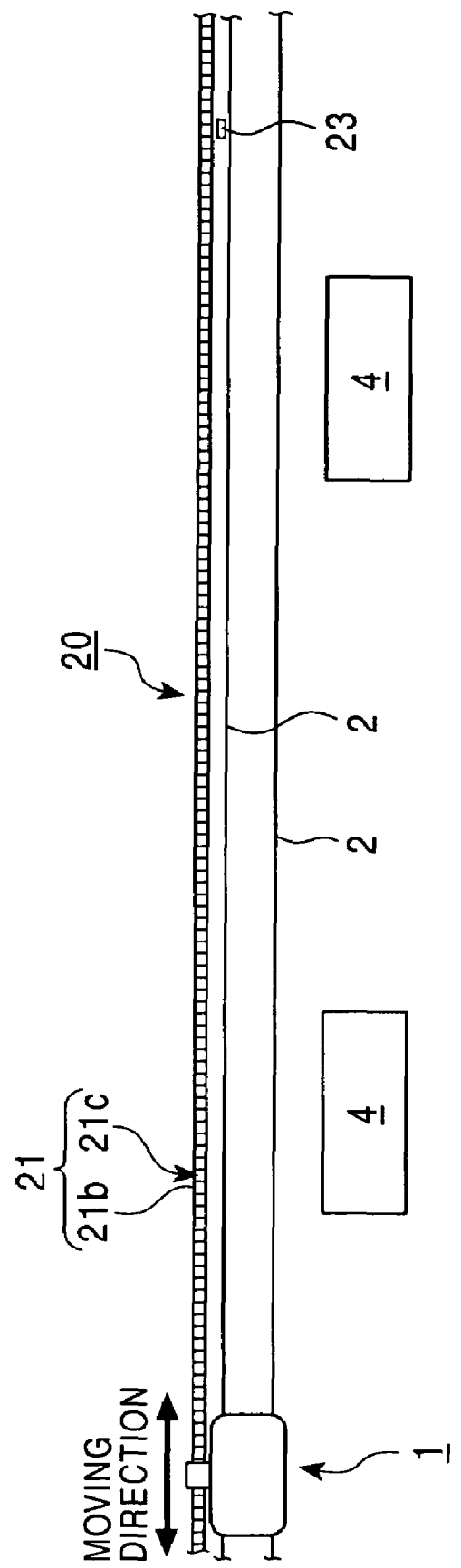
FIG. 1 is a plan view schematically showing the configuration of an automated guided vehicle system.

FIG. 1 schematically shows the configuration of the automated guided vehicle system. In a clean room in a semiconductor manufacturing plant or the like, running rails 2, 2 are laid which constitute a moving path for an automated guided vehicle (hereinafter referred to as "guided vehicle") 1. Processing devices 4, 4, . . . or the like are arranged along the running rails 2, 2. A detected member 20 is laid along the running rail 2. The automated guided vehicle 1 is configured to determine its running position by detecting the detected member 20. In the present embodiment, the detected member 20 is placed at a side of one of the running rails 2. However, the detected member 20 may be placed between the running rails 2, 2 or above the running rails 2, 2. The placement and configuration of the detected member 20 are not particularly limited provided that it is extended along the moving path for the guided vehicle 1.

Figure 2:
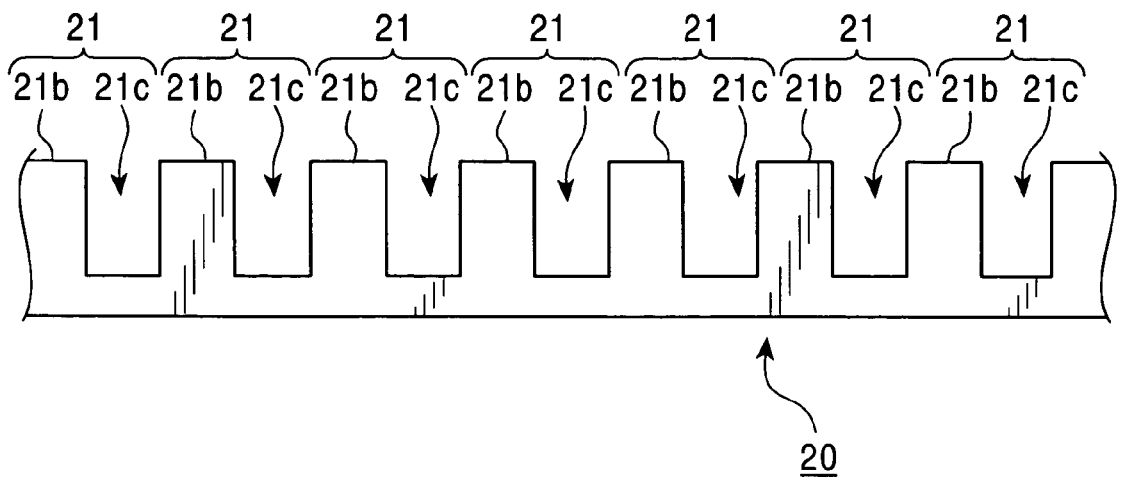
FIG. 2 is a side view of a detected member.

The detected member 20 is provided with a large number of mark members 21, 21, . . . in the direction in which the guided vehicle 1 moves. Each of the mark members 21 comprises a detected portion 21b that can be detected by detecting means of the guided vehicle 1 and a non-detected portion 21c that is not detected by the detecting means. FIG. 2 shows an example of the detected member 20. The detected member 20 is configured like comb teeth. A comb tooth portion of the detected portion is the detected portion 21b, while the gap between the comb teeth is the non-detected portion 21c. In the moving direction of the guided vehicle 1, the width of the detected portion 21b is equal to the width of the non-detected portion 21c. With this configuration, the distance form an ON signal outputted by the detecting means, described later, upon detecting one end of the detected portion 21b to an OFF signal outputted by the detecting means upon detecting the other end of the detected portion 21b (one end of the non-detected portion 21c) is the same as the distance from an OFF signal outputted by the detecting means upon detecting the other end of the detected portion 21b (one end of the non-detected portion 21c) to an ON signal outputted by the detecting means upon detecting one end of the adjacent detected portion 21b (other end of the non-detected portion 21c). Thus, simply by counting the number of ON and OFF signals, it is possible to determine the moving distance. The detected member 20 need not be shaped like comb teeth but like a laid ladder. Its configuration is not particularly limited.

Figure 3:
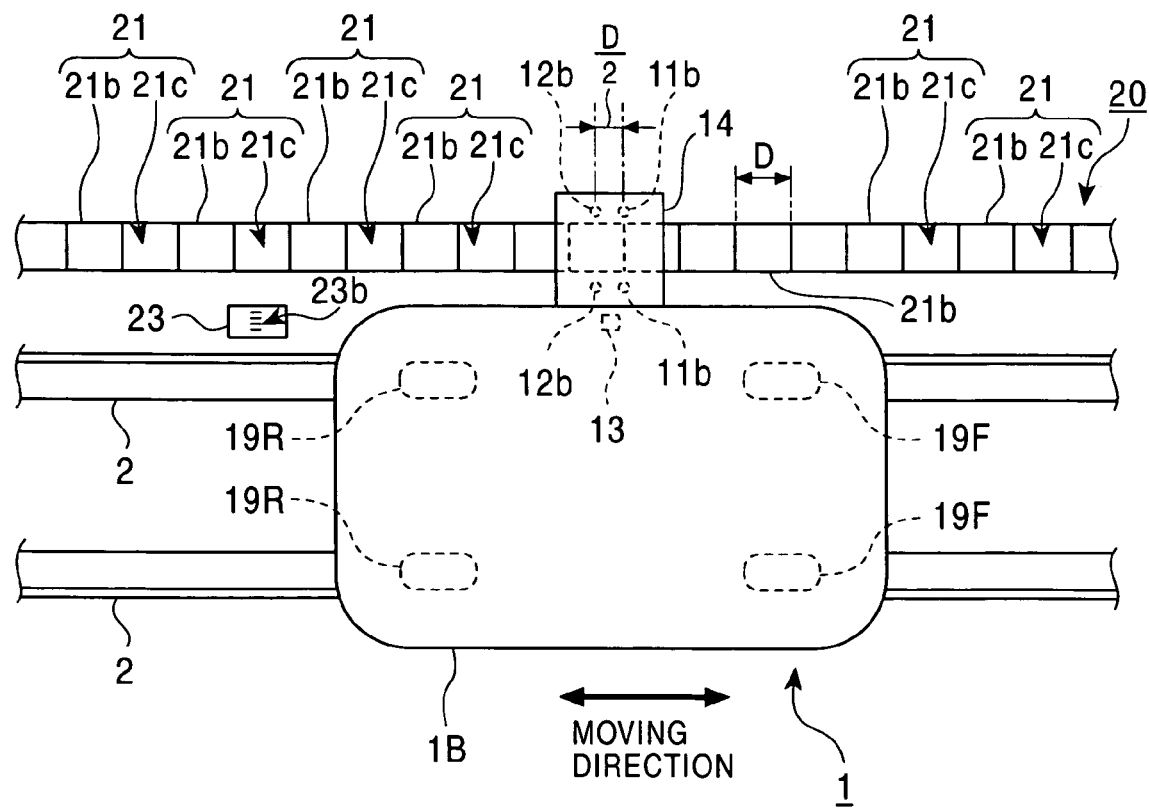
FIG. 3 is a plan view showing the configuration of a guided vehicle.
Figure 4:
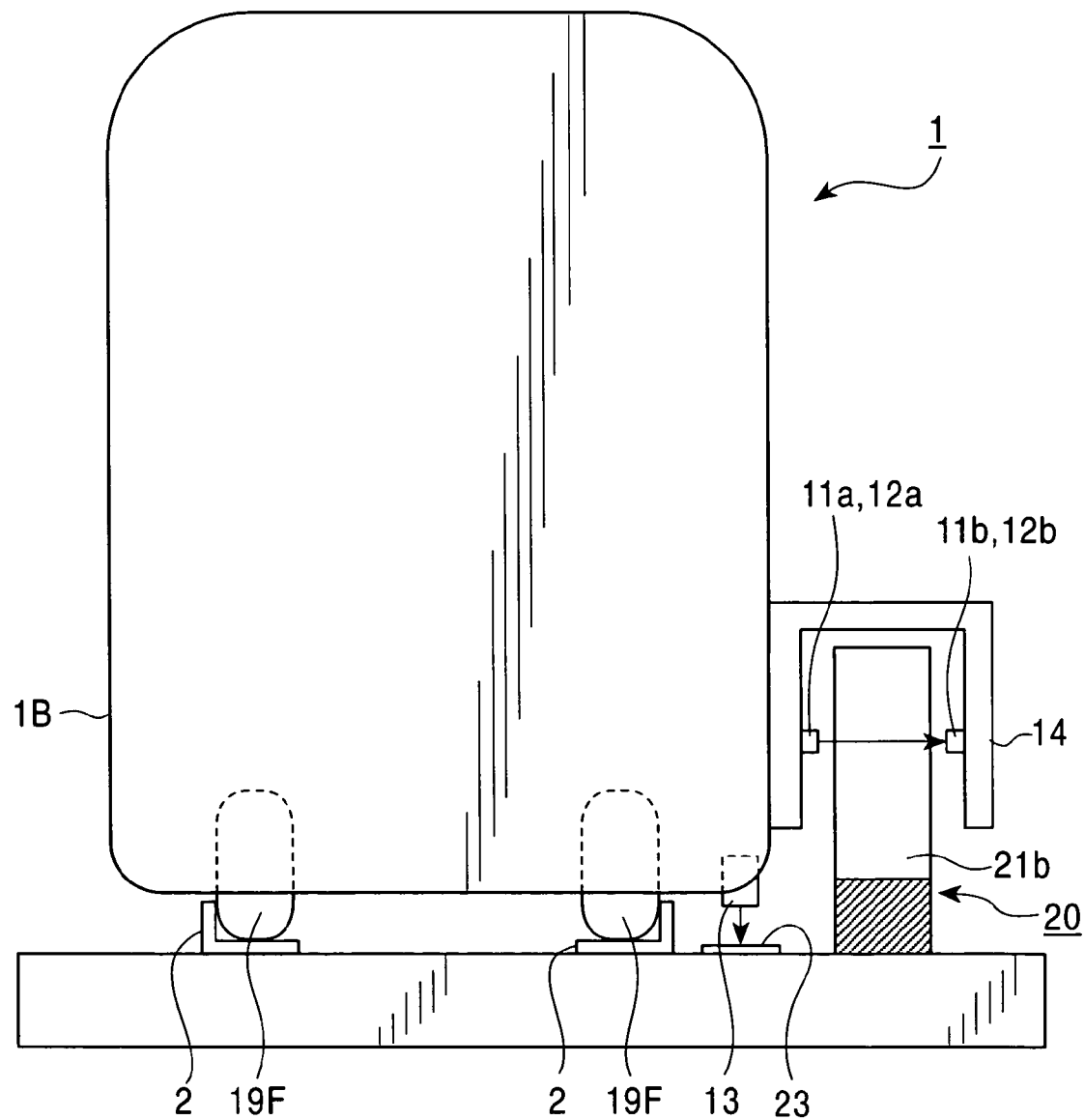
FIG. 4 is a front view showing the configuration of the guided vehicle.

Now, the guided vehicle 1 will be described. As shown in FIGS. 3 and 4, the guided vehicle 1, a moving body, has a vehicle main body 1B supported by front wheels 19F, 19F and rear wheels 19R, 19R. The guided vehicle 1 is configured for a four wheel drive in order to reduce the possibility of a slip. Driving source 18F, 18R are attached to the front wheels 19F, 19F and the rear wheels 19R, 19R, respectively (see FIG. 5). The driving sources 18F, 18R are constructed using, for example, serve motors that can be rotated forward and backward. The guided vehicle 1 is configured to move forward and backward.

Figure 5:
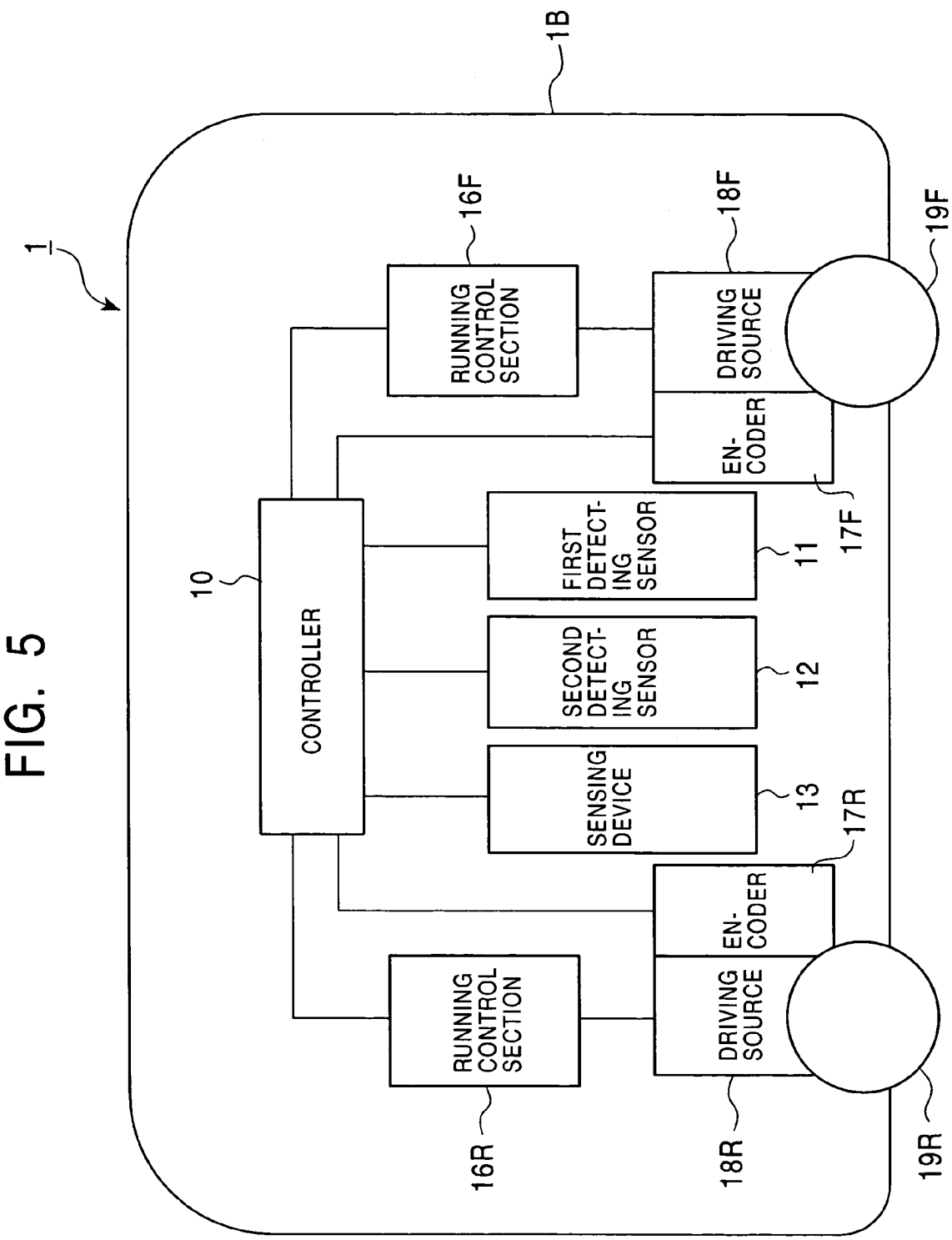
FIG. 5 is a block diagram showing a control arrangement for the guided vehicle.

FIG. 5 shows a control arrangement for the guided vehicle 1. The guided vehicle 1 is provided with a controller 10 that controls its running and the transfer of work pieces. The controller 20 connects communicatively to a running control section 16F that controls the driving source 18F for the front wheels 19F, 19F and a running control section 16R that controls the driving source 18R for the rear wheels 19R, 19R. Encoders 17F, 17R are attached to driving shafts of the driving sources 18F, 18R, respectively, to measure the distance that the guided vehicle 1 has moved. The encoders 17F, 17R are communicatively connected to the controller 10. While the guided vehicle 1 is moving, the encoders 17F, 17R, rotation speed detecting means, detect the rotation speeds of the front wheels 19F, 19F and 19R, 19R. Further, the controller 10, control means, references a measured value from the encoder 17R (or 17F) of the driving source 18R (or 18F) of the wheels 19R, 19R (or 19F, 19F) located on the rear side relative to the advancing direction when the guided vehicle 1 is accelerated or runs at a uniform speed. The controller 10 references a measured value from the encoder 17F (or 17R) of the driving source 18F (or 18R) of the wheels 19F, 19F (or 19R, 19R) located on the front side relative to the advancing direction when the guided vehicle 1 is decelerated.

A description will be given below of the reason why the controller 10 operates as described above. During acceleration, gravity is applied to the wheels 19R, 19R (or 19F, 19F) located on the rear side relative to the advancing direction to cause the wheels 19F, 19F (or 19R, 19R) located on the front side relative to the advancing direction to float. Thus, a slip is likely to occur between the front wheels 19F, 19F (or rear wheels 19R, 19R) and the running rails 2, 2. In this case, the controller 10 determines the moving speed or distance on the basis of the measured value from the encoder 17R (or 17F) of the driving source 18R (or 18F) of the rear wheels 19R, 19R (or front wheels 19F, 19F). On the other hand, during deceleration, the gravity is applied to the wheels 19F, 19F (or 19R, 19R) located on the front side relative to the advancing direction to cause the wheels 19R, 19R (or 19F, 19F) located on the rear side relative to the advancing direction to float. Thus, a slip is likely to occur between the front wheels 19R, 19R (19F, 19F) and the running rails 2, 2. In this case, the controller 10 determines the moving speed or distance on the basis of the measured value from the encoder 17F (or 17R) of the driving source 18F (or 18R) of the rear wheels 19F, 19F (or 19R, 19R).

In the present embodiment, while the guided vehicle 1 is moving at a uniform speed, the controller 10 determines the moving speed or distance on the basis of the measured value from the encoder 17R (or 17F) of the driving source 18R (or 18F) of the wheels 19R, 19R (or 19F, 19F) located on the rear side relative to the advancing direction. However, the controller 10 may be configured to determine the moving speed or distance on the basis of the measured value from the encoder 17F (or 17R) of the driving source 18F (or 18R) of the wheels 19F, 19F (or 19R, 19R) located on the front side relative to the advancing direction. In the above configuration, the controller 10 more accurately measures the moving speed or distance by switching to the encoder 17F/17R, corresponding to the wheels 19F, 19F or 19R, 19R, which are unlikely to slip, depending on the acceleration/deceleration of the guided vehicle 1. This makes the system more reliable.

The controller 10 determines the ratio of a torque required to drive the front wheels 19F, 19F to a torque required to drive the rear wheels 19R, 19R depending on the acceleration/deceleration of the guided vehicle 1. The controller 10 outputs torque instruction values to the running control sections 16F, 16R. The running control section 16F (16R) controls the torque of the driving source 18F (18R) on the basis of the torque instruction value. The ratio of the torque instruction value for the running control section 16F to the torque instruction value for the running control section 16R is set so as to minimize the possibility of a slip between the wheels 19F, 19F, 19R, 19R and the running rails 2, 2. Specifically, when the guided vehicle 1 is accelerated, the torque instruction value for the running control section 16R (or 16F) corresponding to the wheels 19R, 19R (or 19F, 19F) which are located on the rear side in the advancing direction and to which the gravity is applied is set to be larger than the torque instruction value for the running control section 16F (or 16R) corresponding to the wheels 19F, 19F (or 19R, 19R) located on the front side in the advancing direction. When the guided vehicle 1 is decelerated, the torque instruction value for the running control section 16F (or 16R) corresponding to the wheels 19F, 19F (or 19R, 19R) which are located on the front side in the advancing direction and to which the gravity is applied is set to be larger than the torque instruction value for the running control section 16R (or 16F) corresponding to the wheels 19R, 19R (or 19F, 19F) located on the rear side in the advancing direction. When the guided vehicle 1 runs at a uniform speed, the torque instruction value for the running control section 16F corresponding to the front wheels 19F, 19F is equal to the torque instruction value for the running control section 16R corresponding to the rear wheels 19R, 19R.

For example, the ratio of the torque instruction value for the running control section 16F (or 16R) corresponding to the wheels 19F, 19F (or 19R, 19R) located on the front side in the advancing direction to the torque instruction value for the running control section 16R (or 16F) corresponding to the wheels 19R, 19R (or 19F, 19F) located on the rear side in the advancing direction is 4 to 6 for acceleration, 6 to 4 for deceleration, and 5 to 5 for uniform speed running. The allocation ratio of the torque values need not be fixed but may be varied on the basis of a rotation speed from the encoder 17F or 17R.

FIG. 3 is a plan view showing the configuration of the guided vehicle 1. A bracket 14 is attached to one side of the guided vehicle 1. Detecting means is provided in the bracket 14 to detect the mark members 21, 21, . . . of the detected member 20. The detecting means is composed of a first detecting sensor 11 and a second detecting sensor 12. Each detecting sensor 11 (12) is composed of a photo sensor comprising a floodlighting element 11a (12a) and a light receiving element 11b (12b).

As shown in FIG. 4, the bracket 14 appears like the letter "U" in a front view. The bracket 14 is placed and configured so that the detected member 20 is located in the space enclosed by the letter "U". Floodlighting elements 11a, 12a and light receiving elements 11b, 12b are attached to the respective (inside and outside) vertical parts of the bracket 14 across the space. The first detecting sensor 11 and the second detecting sensor 12 are arranged in parallel in the moving direction of the guided vehicle 1. The spacing W between the first detecting sensor 11 and the second detecting sensor 12 is half the width D [mm] of the detected portion 21b of the detected member 20 in the moving direction of the guided vehicle 1 (see FIG. 3). In general, the spacing W between the first detecting sensor 11 and the second detecting sensor 12 meets the relation shown below provided that the detected portion 21b has the width D.

$$W=(2n+1/2)D\ (n=0, 1, 2, \dots)$$

In this configuration, the floodlighting element 11a (12a) of each detecting sensor 11 (12) projects a light beam on the light receiving element 11b (12b). The light beam is blocked and unblocked every time the guided vehicle 1 moves to pass the detecting sensor 11 (12) by the detected portion 21b, 21b, . . . of the detected member 20.

Specifically, when the detecting sensor 11 (12) nears one end of the detected portion 21b, the light beam from the floodlighting element 11a (12a) to the light receiving element 11b (12b) is blocked to cause an OFF signal to be outputted to the controller 10. When the detecting sensor 11 (12) passes the other end of the detected portion 21b and nears the non-detected portion 21c, the light receiving element 11b (12b) receives a light beam from the floodlighting element 11a (12a) to output an ON signal to the controller 10. In this manner, the detecting sensor 11 (12) intermittently outputs an ON/OFF signals to the controller 10.

Figure 6:
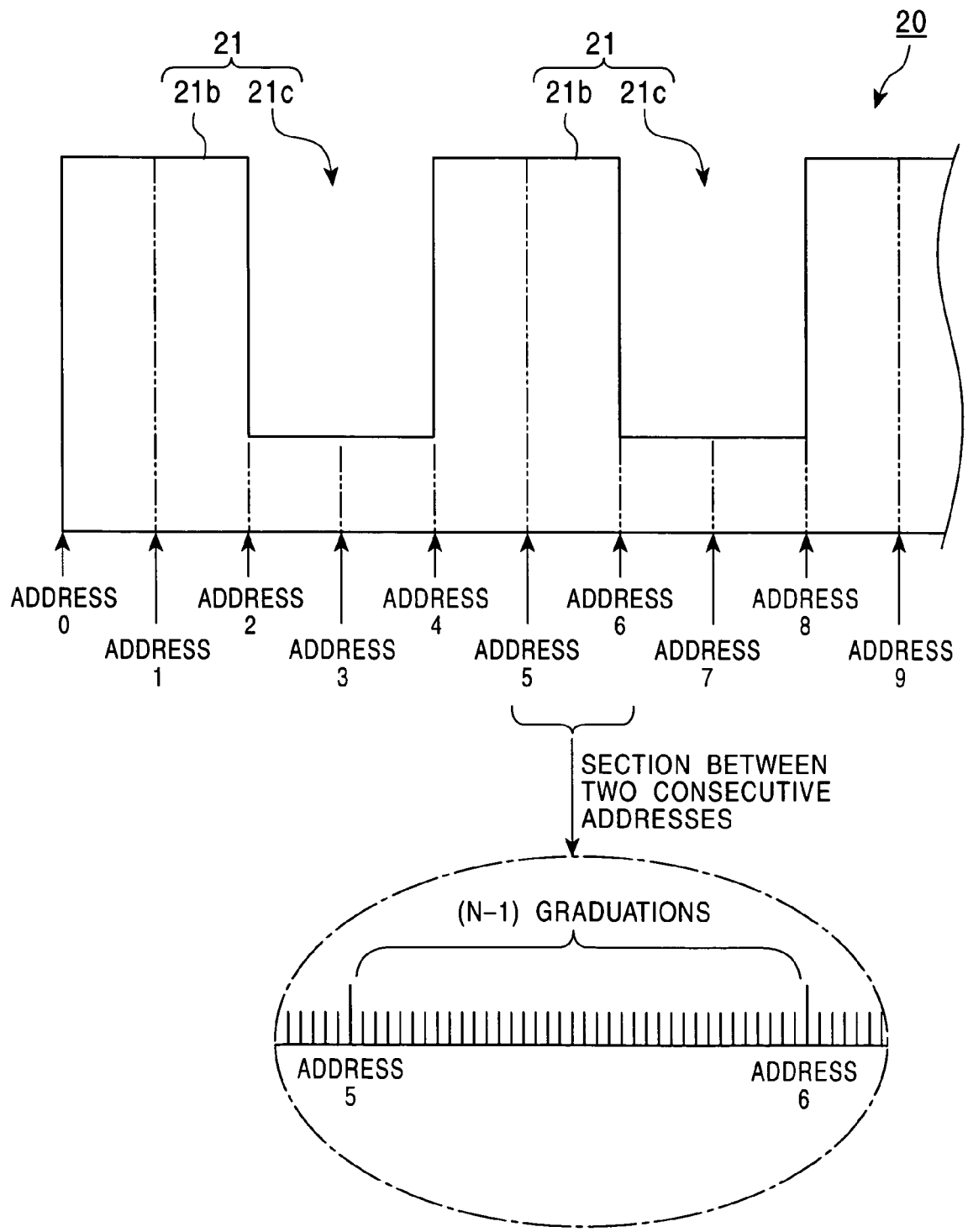
FIG. 6 is a view showing the configuration of addresses on the detected member.
Figure 8:
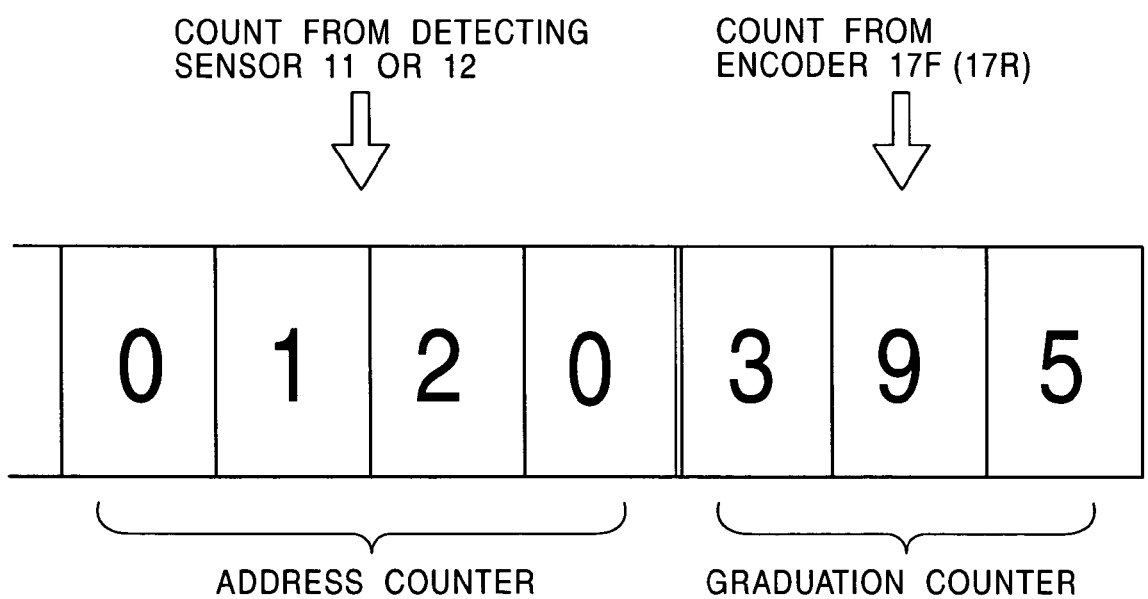
FIG. 8 is a view illustrating the configuration of a counter.
Figure 9A:
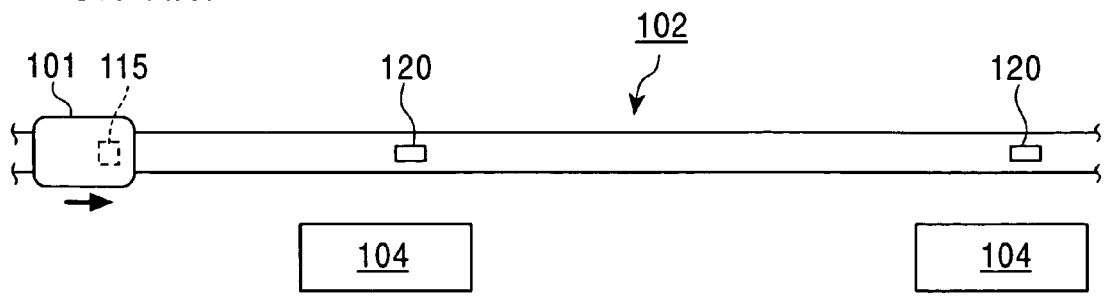
FIG. 9 is a plan view schematically showing the configuration of a conventional automated guided vehicle system.
Figure 9B:
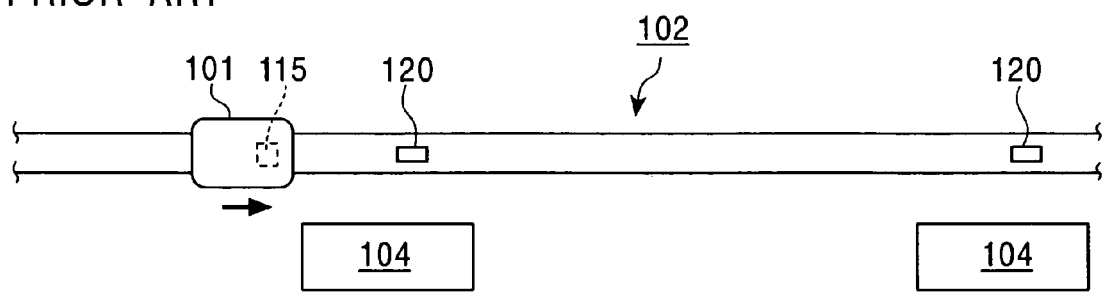
Figure 9C:
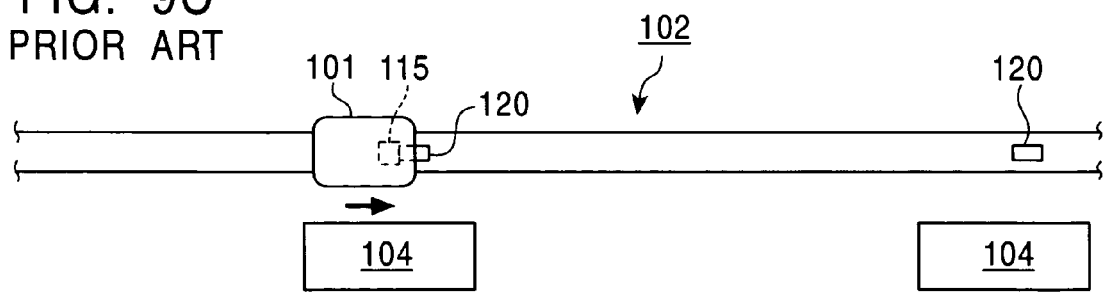
Figure 9D:
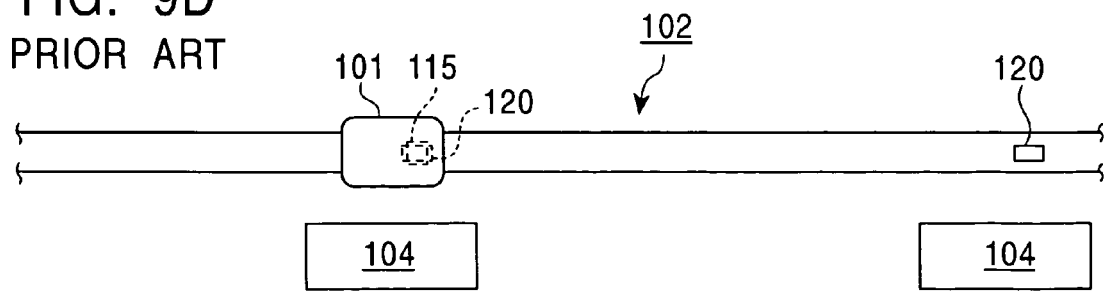
Figure 10A:
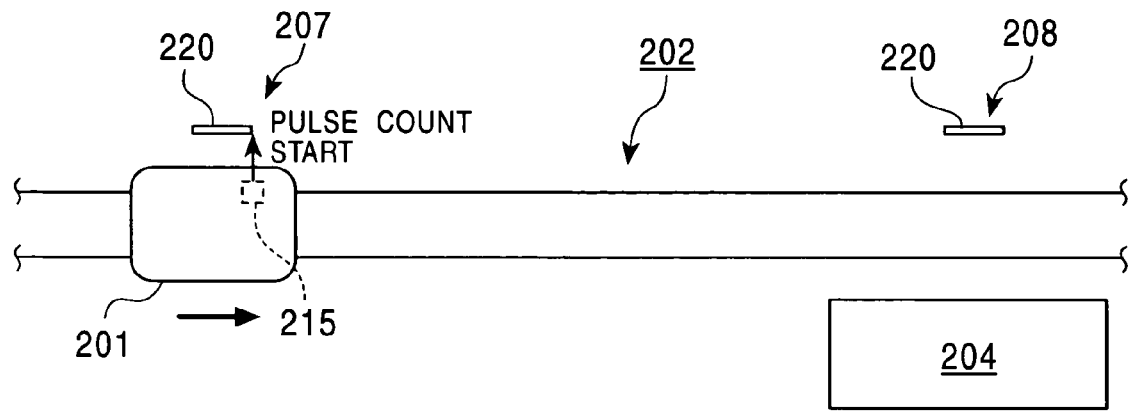
FIG. 10 is a plan view schematically showing the configuration of the conventional automated guided vehicle system.
Figure 10B:
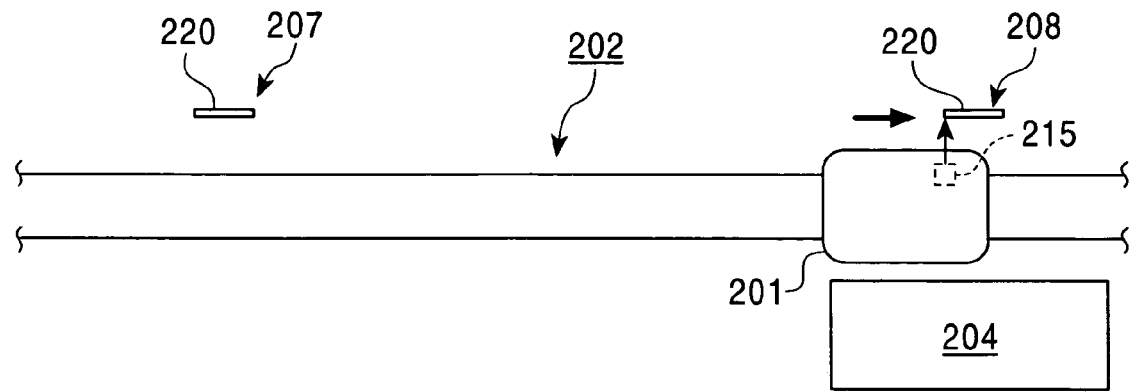
Figure 10C:
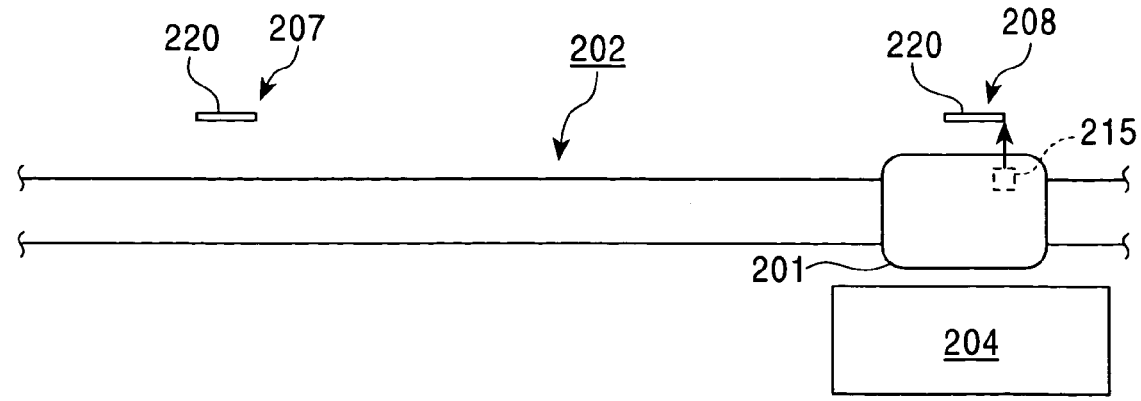

The controller 10 comprises an address counter that counts the numbers of ON and OFF signals from the detecting sensors 11, 12 (see FIG. 8). The controller 10 roughly determines the moved position of the guided vehicle 1 on the basis of the numbers of signals counted by the address counter. In brief, as shown in FIG. 6, addresses are assigned to the detected portions 21b, 21b, . . . and non-detected portions 21c, 21c, . . . of each of the mark members 21, 21, . . . of the detected member 20 with reference to the detected portion 21b or non-detected portion 21c of a certain mark member 21. The addresses are consecutive from one end to other end of the detected member 20 in its longitudinal direction. The controller 10 uses the address counter to count the numbers of ON and OFF signals from the detecting sensors 11, 12 to recognize what address the guided vehicle 1 has reached. On the basis of this address, the controller 10 determines the moved position of the guided vehicle 1.

Further, the controller 10 can recognize the moving direction of the guided vehicle 1 using the first detecting sensor 11 and second detecting sensor 12, which are provided in parallel in the moving direction of the guided vehicle 1. Specifically, when the first detecting sensor 11 detects a certain detected portion 21b (or non-detected portion 21c) on the detected member 20 earlier than the second detecting sensor 12, the controller 10 determines that the guided vehicle 1 is moving forward. In contrast, when the second detecting sensor 12 detects the certain detected portion 21b (or non-detected portion 21c) earlier than the first detecting sensor 11, the controller 10 determines that the guided vehicle 1 is moving backward.

Moreover, a plurality of sensed members 23, 23, . . . are arranged in parallel along the running rails 2, the moving path for the guided vehicle 1 (see FIG. 1). The guided vehicle 1 is provided with a sensing device 13 at its bottom to sense the sensed members 23, 23, . . . The sensed members 23, 23, . . . are arranged at predetermined intervals in association with addresses on the detected member 20, described later. In the present embodiment, the sensed members 23 are arranged at a side of one of the running rails 2. However, the sensed members 23 my be arranged between the running rails 2, 2. The arrangement and configuration of the sensed members 23 are not particularly limited provided that they are arranged along the moving path for the guided vehicle 1.

A bar code 23b is applied to each of the sensed members 23 and contains positional information on the position of that sensed member 23. The detecting device 13, mounted in the guided vehicle 1, reads the bar codes 23b, 23b, . . . of the sensed members 23, 23, . . . to determine the passed point. Alternatively, no bar codes may be applied to the sensed members 23, 23, . . . and the detecting device 13 simply detects the sensed members 23, 23, . . . so that the passed point can be determined by counting the number of sensed members 23, 23, . . . detected by the controller 10.

Now, the addresses on the detected member 20 will be described. As shown in FIG. 6, in each of the mark members 21 of the detected member 20, addresses are assigned to four points including the opposite ends and center of the detected portion 21b and the center of the non-detected portion 21c in the moving direction of the guided vehicle 1. The combination of the first detecting sensor 11 and second detecting sensor 12 detects the four addresses of each mark member 21 to output a corresponding detection signal to the controller 10. The controller 10 roughly determines the moved position of the guided vehicle 1 by using the address counter to count the addresses.

As previously described, the spacing between the first detecting sensor 11 and the second detecting sensor 12 is half the width of the detected portion (or non-detected portion 21c) of the detected member 20 in the moving direction of the guided vehicle 1. The two detecting sensors 11 and 12 detect each mark member 21 of the detected member 20 as described below.

Figure 7A:
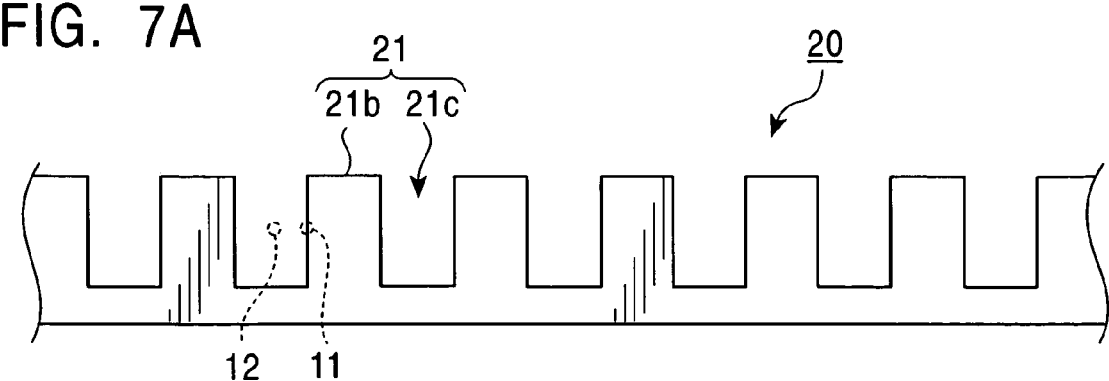
FIG. 7 is a side view of the detected member.
Figure 7B:
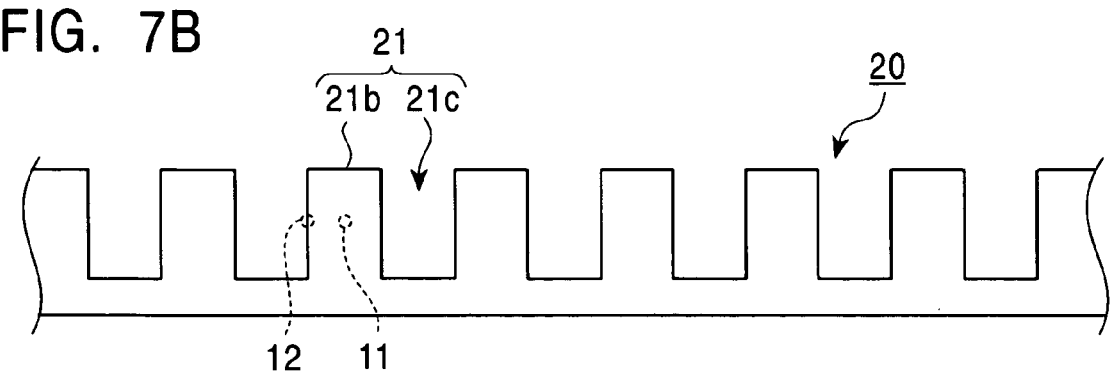
Figure 7C:
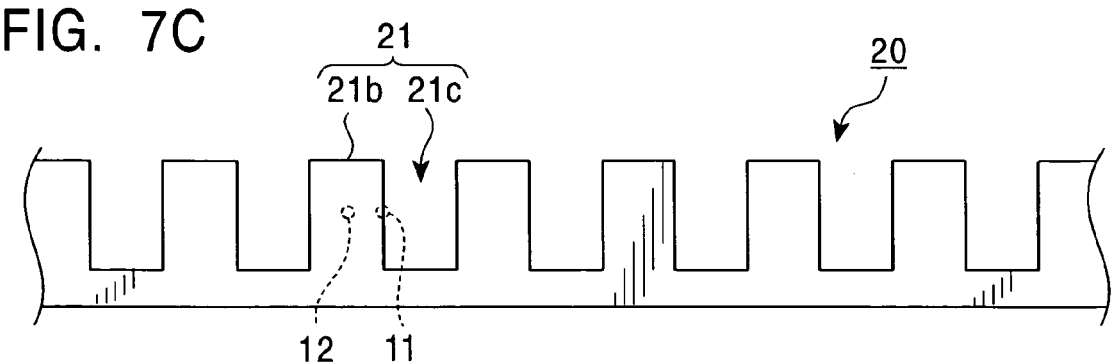
Figure 7D:
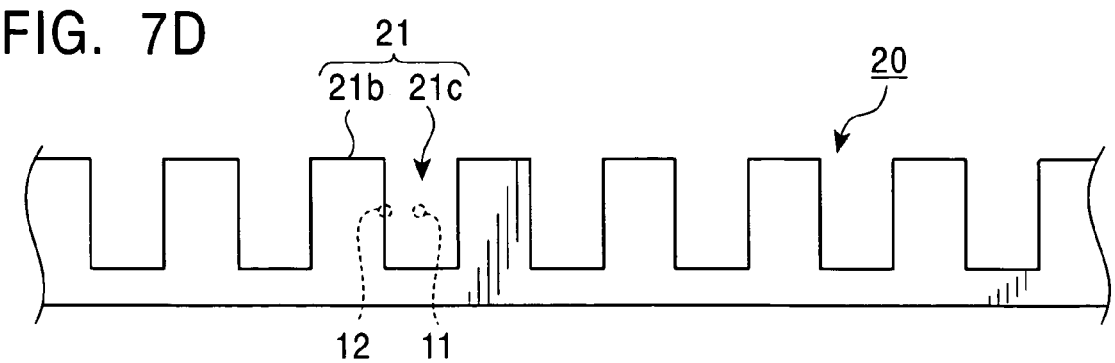

As shown in FIG. 7, while the guided vehicle 1 is moving, at a first detection point, the first detecting sensor 11 detects one end of the detected portion 21b of the mark member 21 (see FIG. 7A). At the first detection point, the first detecting sensor 11 outputs an ON signal to the address counter of the controller 10. Then, the second detecting sensor 12 detects one end of the detected portion 21b of the mark member 21 at a second detection point, (see FIG. 7B). At the second detection point, the first detecting sensor 11 is located in the center of the detected portion 21b. At this time, the second detecting sensor 12 outputs an ON signal to the address counter of the controller 10. Then, at a third detection point, the first detecting sensor 11 detects the other end of the detected portion 21b of the mark member 21 (see FIG. 7C). At the third detection point, the first detecting sensor 11 outputs an OFF signal to the address counter of the controller 10. Finally, the second detecting sensor 12 detects the other end of the detected portion 21b of the mark member 21 at a fourth detection point, (see FIG. 7D). At the fourth detection point, the first detecting sensor 11 is located in the center of the non-detected portion 21c. At this time, the second detecting sensor 12 outputs an OFF signal to the address counter of the controller 10. As described above, for the address counter of the controller 10, the combination of the first detecting sensor 11 and second detecting sensor 12 detects the four detection points in each mark member 21, and an address is assigned to each of the four detection points.

Now, a description will be given of graduations assigned to the addresses. The encoder 17F (17R) is configured to output a signal with N pulses (N is a natural number) between two consecutive addresses. The section between the addresses is divided into N pieces so as to enable the measurement of the moving distance of the guided vehicle 1. In brief, as shown in FIG. 6, (N−1) graduations are assigned to the section between the addresses. The section between the addresses is interpolated using these graduations. The encoder 17F (17R) thus precisely determines the moved position of the guided vehicle 1 by counting the number of graduations between the addresses.

In the present embodiment, the distance between two consecutive addresses is 10 [mm]. The encoder 17F (17R) is configured to output a signal with 1,000 pulses between two consecutive addresses, that is, to measure the moving distance of the guided vehicle 1 at 0.01 [mm] increments. FIG. 8 shows a counter provided in the controller 10 of the guided vehicle 1. The counter comprises an address counter and a graduation counter. Lower three digits are a value inputted by the encoder 17F (17R) and indicate the count of graduations between two consecutive addresses. The fourth digit from the bottom and upper digits are a value inputted by the detecting sensors 11, 12 and indicate the count of an address. Each address is set by combining the count of that address with the count of graduations between this address and the adjacent address. For example, the address shown in FIG. 8 indicates the position of the 395-th graduation at the address 120. This indicates that the guided vehicle 1 is positioned 1203.95 [mm] away from a reference point. This is an absolute address provided along the detected member 20. The guided vehicle 1 can be stopped at an arbitrary position on the detected member 20 by specifying the corresponding address.

The controller 10 of the guided vehicle 1 is also configured to reset the measurement of the moving distance by the encoder 17F (17R) to an origin every time the detecting sensor 11 or 12 detects the address of a mark member 21 of the detected member 20. Consequently, the moving distance is measured without any errors, thus making the system more reliable. Specifically, every time the detecting sensor 11 or 12 detects the address of a mark member 21 of the detected member 20, the graduation counter is reset to the origin "000". Further, the graduation counter is incremented by one during forward movement and is decremented by one during backward movement. Every time the graduation counter receives a pulse signal from the encoder 17F (17R), the graduation counter is counted up during forward movement and is counted down during backward movement. With this configuration, the controller 10 determines the moved position using the absolute address regardless of the moving direction of the guided vehicle 1.

If the guided vehicle 1 slips during running, the encounter 17F (17R) may fail to accurately count 1,000 between two consecutive addresses. If the count between two consecutive addresses is less than 1,000, the graduation counter is reset to the origin when the detecting sensor 11 or 12 detects the address of a mark member 21 of the detected member 20. On the other hand, if the count between two consecutive addresses exceeds 1,000, then during forward movement, the graduation counter stops counting once it is counted up to "999". Then, when the detecting sensor 11 or 12 detects the address of a mark member 21 of the detected member 20, the origin resetting is carried out. During backward movement, the graduation counter stops counting once it is counted down to "001" or "000". Then, when the detecting sensor 11 or 12 detects the address of a mark member 21 of the detected member 20, the origin resetting is carried out.

Now, a description will be given of deceleration and stop control of the guided vehicle 1. When a destination (processing device 4 or the like) is specified, a running program in which timings for acceleration and deceleration and the like are written is created for the guided vehicle 1. Then, the running of the guided vehicle 1 is controlled in accordance with the running program. The controller 10 of the guided vehicle 1 roughly determines the moved position by using the detecting sensors 11, 12 to detect the address of each mark member 21, 21, . . . of the detected member 20 until the address of the mark member 21 located immediately in front of the stop target position is reached. Moreover, the sensing device 13, provided in the guided vehicle 1, detects the positional information on the sensed members 23 distributed along the running rails 2, 2. Thus, it is determined whether or not the detecting sensor 11 or 12 has failed to read any of the addresses of the detected member 20. If the detecting sensor 11 or 12 has failed to read any of the addresses, corrections are made on the basis of the positional information on the sensed members 23 sensed by the sensing device 13. This makes the system more reliable. Then, on the basis of the detected addresses, the guided vehicle 1 is controllably decelerated so as to start to be decelerated upon nearing a stop target position and to reach an about-to-stop speed at a detection point located at the boundary between an address belonging to the stop target position and an address immediately in front of this address. At the about-to-stop speed, the guided vehicle can be immediately stopped at any time. The guided vehicle 1 is controlled to use the encoder 17F (17R) to measure the moving distance at 0.01 [mm] increments starting with the above address before precisely stopping at the stop target position.

The above configuration prevents the following situation: there occurs a difference between the actual moving distance and the moving distance determined by the guided vehicle 1, so that deceleration is started earlier than scheduled and the guided vehicle 1 starts to run at the about-to-stop speed in front of and relatively away from the stopped position. As a result, the guided vehicle 1 can be moved quickly to the stop target position. Therefore, operations can be performed more easily and efficiently. Further, according to the present invention, the controller 10 of the guided vehicle 1 can substantially accurately determine the moved position of the guided vehicle 1 wherever it is on the running rails 2, 2. The guided vehicle 1 can be precisely stopped anywhere on the moving path. This makes the system more versatile.

The moving body system in which the moving body moves in the horizontal direction has been described taking the automated guided vehicle system by way of example. However, the present invention is also applicable to a moving body system in which a moving body moves in the vertical direction or obliquely upward or downward along a slope or the like. The direction in which the moving body moves is not particularly limited. Further, the moving path for the moving body is not limited to the linear path but may include curved portions.

Figure 13:
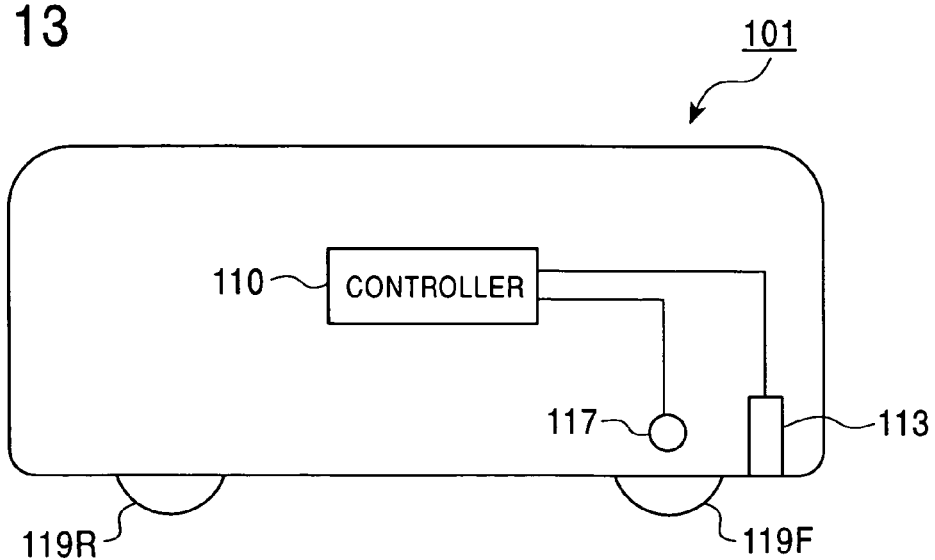
FIG. 13 is a block diagram showing a control arrangement for a conventional guided vehicle.

In FIG. 13, if the moving distance is measured using an encoder 117, the running characteristic of a guided vehicle 101 may vary between the case in which the guided vehicle 101 is being accelerated and the case in which the guided vehicle 101 is being decelerated. As a result, the disadvantages described below may occur. While the guided vehicle 101 is being accelerated, the gravity is applied to the wheels located on the rear side relative to the advancing direction, to cause the wheels located on the front side relative to the advancing direction to float. Thus, a slip is likely to occur between the front wheels and the moving path. While the guided vehicle 101 is being decelerated, the gravity is applied to the wheels located on the front side relative to the advancing direction, to cause the wheels located on the rear side relative to the advancing direction to float. Thus, a slip is likely to occur between the rear wheels and the moving path. Thus, if the moving distance of the guided vehicle 101 is measured using the encoder 117, attached to front wheels 119F, 119F, there may be a difference between the moving distance obtained from output pulses from the encoder 117 and the actual moving distance because the running of the guided vehicle 101 involves acceleration/deceleration. Moreover, the guided vehicle 101 is often configured to be movable forward and backward. Thus, the measurement of the moving distance by the encoder 117, attached to the front wheels 119F, 119F, is accurate if the guided vehicle approaches the stopped position from behind through deceleration. However, the measurement is less accurate if the guided vehicle approaches the stopped position from front through deceleration. Consequently, there is likely to be a difference between the measured moving distance and the actual moving distance.

Thus, in view of these points, it is an object of the present invention to provide a moving body such as a guided vehicle or a stacker crane which can more accurately measure the moving speed or distance.

First, as set forth in claim 11, there is provided a moving body comprising driving wheels located on a front and rear sides in its moving direction, the moving body comprising first rotation speed detecting means for detecting a rotation speed of the driving wheels on the front side in the moving direction, second rotation speed detecting means for detecting a rotation speed of the driving wheels on the rear side in the moving direction, and control means for referencing the rotation speed of the driving wheels on the rear side in the moving direction which speed is detected by the second rotation speed detecting means, while the moving body is being accelerated, and referencing the rotation speed of the driving wheels on the front side in the moving direction which speed is detected by the first rotation speed detecting means, while the moving body is being decelerated.

Further, as set forth in claim 12, the control means references the rotation speed detected by either the first rotation speed detecting means or the second rotation speed detecting means while the moving body is moving at a uniform speed.

As set forth in claim 13, the control means calculates a moved distance by summing the rotation speeds referenced by the respective rotation speed detecting means.

As set forth in claim 14, the control means comprises determining means for determining that the moving body is being accelerated if a variation in rotation speed per unit time determined by the first rotation speed detecting means or second rotation speed detecting means is positive and determining that the moving body is being decelerated if a variation in rotation speed per unit time determined by the first rotation speed detecting means or second rotation speed detecting means is negative.

An aspect of the invention set forth in claim 11 produces the effect described below. While the moving body is being accelerated, the gravity is applied to the wheels located on the rear side in the moving direction to cause the wheels located on the front side in the moving direction to float. Thus, the control means of the moving body references the rotation speed of the driving wheels located on the rear side in the moving direction. While the moving body is being decelerated, the gravity is applied to the wheels located on the front side in the moving direction to cause the wheels located on the rear side in the moving direction to float. Thus, the control means of the moving body references the rotation speed of the driving wheels located on the front side in the moving direction. This allows the moving speed and distance to be more accurately measured.

An aspect of the invention set forth in claim 12 produces the effect described below. While the moving body is being accelerated, the gravity is applied to the wheels located on the rear side in the moving direction to cause the wheels located on the front side in the moving direction to float. That is, the magnitude of the slip between the wheels located on the rear side in the moving direction and the moving path is smaller than that of the slip between the wheels located on the front side in the moving direction and the moving path. Thus, the control means of the moving body references the rotation speed of the driving wheels located on the rear side in the moving direction. While the moving body is being decelerated, the gravity is applied to the wheels located on the front side in the moving direction to cause the wheels located on the rear side in the moving direction to float. That is, the magnitude of the slip between the wheels located on the front side in the moving direction and the moving path is smaller than that of the slip between the wheels located on the rear side in the moving direction and the moving path. Thus, the control means of the moving body references the rotation speed of the driving wheels located on the front side in the moving direction. While the moving body is moving at a uniform speed, the control means references the rotation speed detected by either the first rotation speed detecting means or the second rotation speed detecting means. This allows the moving speed and distance to be more accurately measured.

According to an aspect of the invention set forth in claim 13, the control means calculates the moving distance by summing the rotation speeds referenced by the respective rotation speed detecting means. The difference between the calculated moving distance and the actual moving distance is small, thus allowing the moving distance to be more accurately measured.

According to an aspect of the invention set forth in claim 14, the determining means of the control means determines that the moving body is being accelerated if a variation in rotation speed per unit time referenced by the first rotation speed detecting means or second rotation speed detecting means is positive. The determining means then references the rotation speed of the driving wheels located on the rear side in the moving direction which rotation speed is detected by the second rotation speed detecting means. The determining means of the control means determines that the moving body is being decelerated if a variation in rotation speed per unit time referenced by the first rotation speed detecting means or second rotation speed detecting means is negative. The determining means then references the rotation speed of the driving wheels located on the front side in the moving direction which rotation speed is detected by the first rotation speed detecting means. This allows the moving speed and distance to be more accurately measured.

Figure 11:
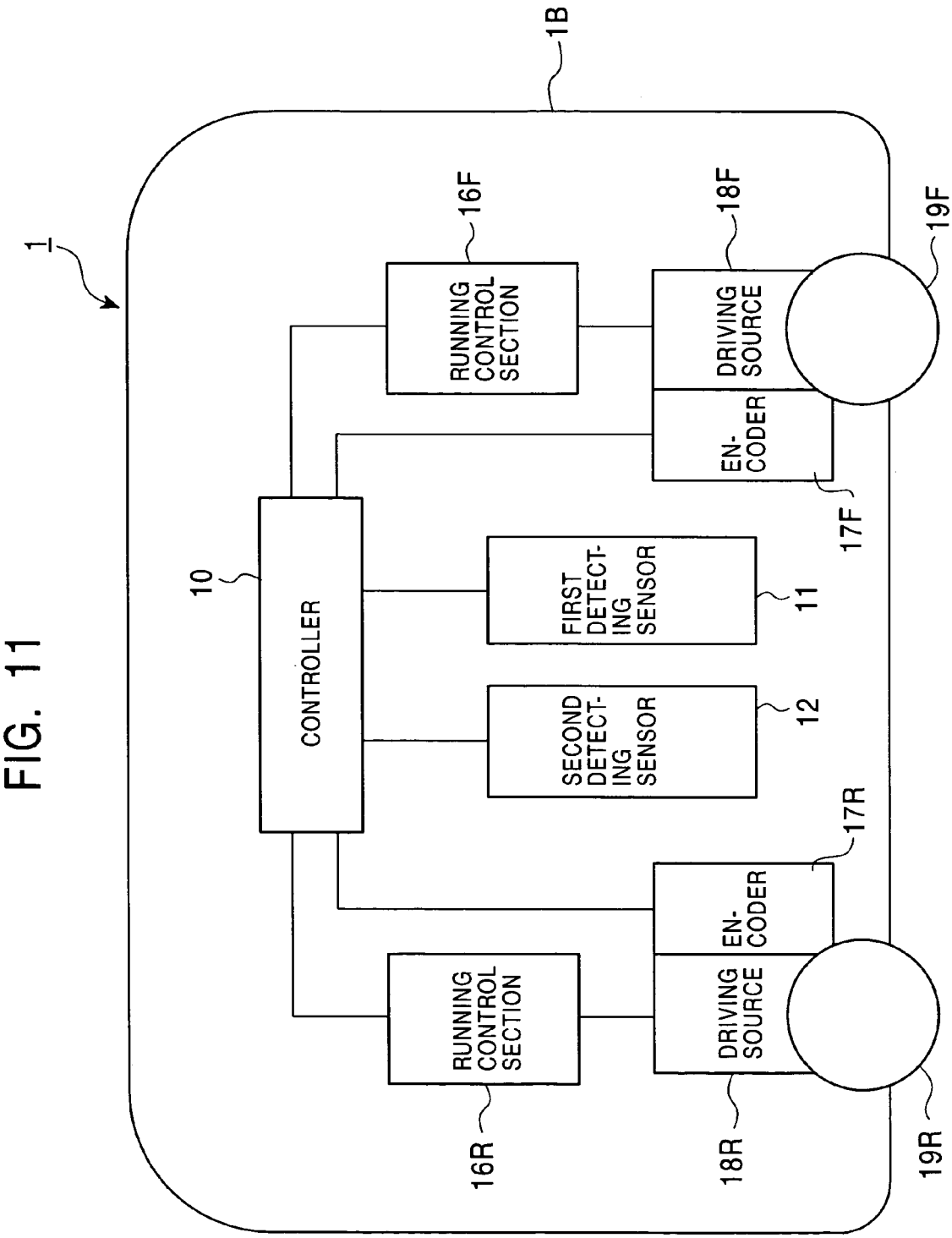
FIG. 11 is a block diagram showing a control arrangement for the guided vehicle.

FIG. 11 shows a control arrangement for the guided vehicle 1. The guided vehicle 1 is provided with the controller 10 that controls its running and the transfer of work pieces. The controller 10 connects communicatively to the running control section 16F that controls the driving source 18F for the front wheels 19F, 19F and the running control section 16R that controls the driving source 18R for the rear wheels 19R, 19R. The encoders 17F, 17R are attached to the driving shafts of the driving sources 18F, 18R, respectively, to measure the distance that the guided vehicle 1 has moved. The encoders 17F, 17R are communicatively connected to the controller 10. While the guided vehicle 1 is moving, both encoders 17F, 17R, rotation speed detecting means, detect the rotation speeds of the wheels 19F, 19F, 19R, 19R. Further, the controller 10, control means, references a detected value from the encoder 17R (or 17F) of the driving source 18R (or 18F) of the wheels 19R, 19R (or 19F, 19F) located on the rear side relative to the advancing direction when the guided vehicle 1 is accelerated or runs at a uniform speed. The controller 10 references a detected value from the encoder 17F (or 17R) of the driving source 18F (or 18R) of the wheels 19F, 19F (or 19R, 19R) located on the front side relative to the advancing direction when the guided vehicle 1 is decelerated.

Figure 12:
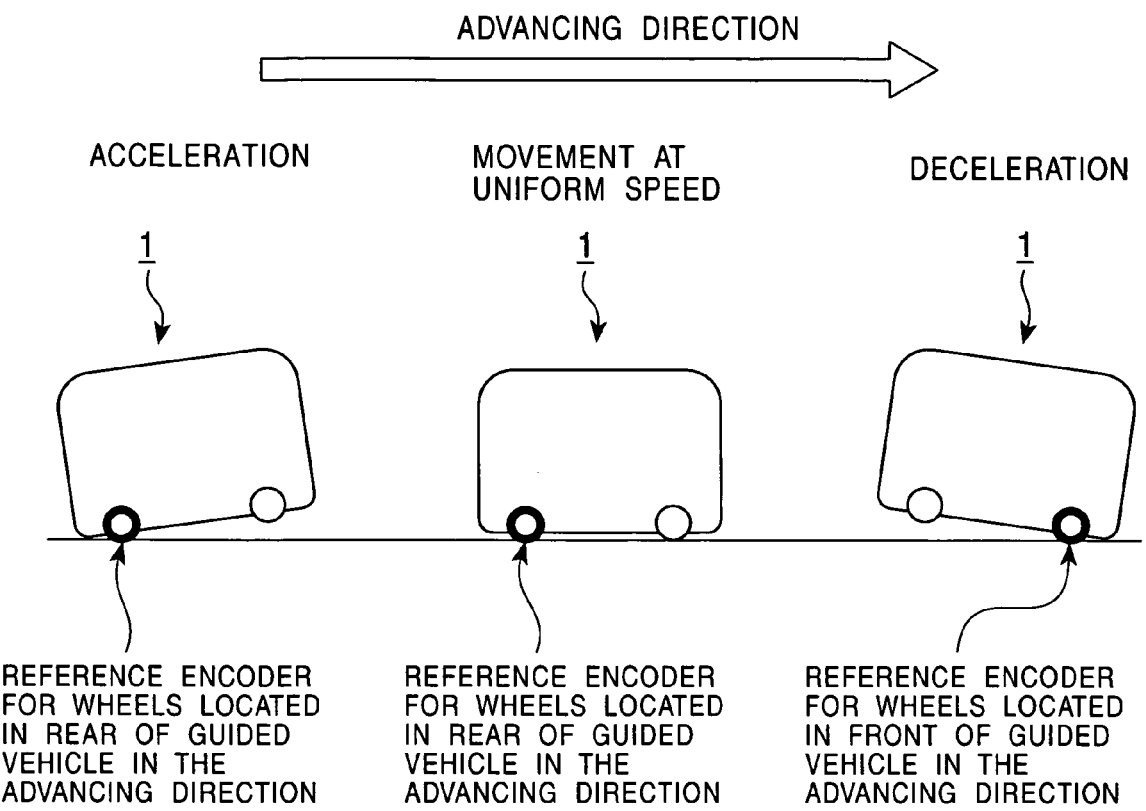
FIG. 12 is a view illustrating acceleration and deceleration of the guided vehicle.

A description will be given below of the reason why the controller 10 operates as described above. As shown in FIGS. 11 and 12, during acceleration, the gravity is applied to the wheels 19R, 19R (or 19F, 19F) located on the rear side relative to the advancing direction to cause the wheels 19F, 19F (or 19R, 19R) located on the front side relative to the advancing direction to float. That is, the magnitude of the slip between the wheels 19R, 19R (or 19F, 19F) located on the rear side in the moving direction, and the running rails 2, 2 is smaller than that of the slip between the wheels 19F, 19F (or 19R, 1R) located on the front side in the moving direction and the running rails 2, 2. In this case, the controller 10 determines the moving speed or distance on the basis of the measured value from the encoder 17R (or 17F) of the driving source 18R (or 18F) of the rear wheels 19R, 19R (or front wheels 19F, 19F). On the other hand, during deceleration, the gravity is applied to the wheels 19F, 19F (or 19R, 19R) located on the front side relative to the advancing direction to cause the wheels 19R, 19R (or 19F, 19F) located on the rear side relative to the advancing direction, to float. That is, the magnitude of the slip between the wheels 19F, 19F (or 19R, 19R) located on the front side in the moving direction and the running rails 2, 2 is smaller than that of the slip between the wheels 19R, 19R (or 19F, 19F) located on the rear side in the moving direction, and the running rails 2, 2. In this case, the controller 10 determines the moving speed or distance on the basis of the measured value from the encoder 17F (or 17R) of the driving source 18F (or 18R) of the wheels 19F, 19F (or 19R, 19R) located on the front side in moving direction.

In the present embodiment, while the guided vehicle 1 is moving at a uniform speed, the controller 10 determines the moving speed or distance on the basis of the measured value from the encoder 17R (or 17F) of the driving source 18R (or 18F) of the wheels 19R, 19R (or 19F, 19F) located on the rear side in the advancing direction. However, the controller 10 may be configured to determine the moving speed or distance on the basis of the measured value from the encoder 17F (or 17R) of the driving source 18F (or 18R) of the wheels 19F, 19F (or 19R, 19R) located on the front side in the advancing direction. Alternatively, the wheel encoder 17F (or 17R) referenced during movement at a uniform speed may not be fixed but may be properly changed. For example, the wheel encoder 17F (or 17R) may be configured to be switched only when the movement shifts to acceleration or deceleration. If the movement shifts to uniform speed running, the wheel encoder 17F (or 17R) referenced in the preceding running state (acceleration or deceleration) continues to be referenced without being switched. With this configuration, if the guided vehicle 1 is accelerated, then runs at a uniform speed, and is accelerated again or it is decelerated, then runs at a uniform speed, and is decelerated again, the referenced wheel encoder 17F (or 17R) is not switched. This reduces the number of times the encoder 17F (17R) is switched, thus simplifying the control arrangement.

Now, the switching control of the encoder 17F/17R will be described. When a destination (processing device 4 or the like) is specified, a running program in which timings for acceleration and deceleration and the like are written is created for the guided vehicle 1. Then, the running of the guided vehicle 1 is controlled in accordance with the running program. The controller 10, control means, comprises comparing means for comparing the magnitude of a torque instruction value outputted to the running control section 16F, corresponding to the front wheels 19F, 19F, with that of a torque instruction value outputted to the running control section 16R, corresponding to the rear wheels 19R, 19R, and switching means for switching the encoder having the measured data referenced, to the encoder 17F/17R corresponding to the running control section 16F/16R to which a larger torque instruction value is allocated.

The ratio of the torque instruction value outputted by the controller 10 to the running control section 16F to the torque instruction value outputted by the controller 10 to the running control section 16R is set so as to minimize the possibility of a slip between the wheels 19F, 19F, 19R, 19R and the running rails 2, 2. Specifically, when the guided vehicle 1 is accelerated, the torque instruction value for the running control section 16R (or 16F) corresponding to the wheels 19R, 19R (or 19F, 19F) which are located on the rear side in the advancing direction and to which the gravity is applied is set to be larger than the torque instruction value for the running control section 16F (or 16R) corresponding to the wheels 19F, 19F (or 19R, 19R) are located on the front side in the advancing direction. When the guided vehicle 1 is decelerated, the torque instruction value for the running control section 16F (or 16R) corresponding to the wheels 19F, 19F (or 19R, 19R) which are located on the front side in the advancing direction and to which the gravity is applied is set to be larger than the torque instruction value for the running control section 16R (or 16F) corresponding to the wheels 19R, 19R (or 19F, 19F) located on the rear side in the advancing direction. When the guided vehicle 1 runs at a uniform speed, the torque instruction value for the running control section 16F corresponding to the front wheels 19F, 19F is equal to the torque instruction value for the running control section 16R corresponding to the rear wheels 19R, 19R.

For example, the ratio of the torque instruction value for the running control section 16F (or 16R) corresponding to the wheels 19F, 19F (or 19R, 19R) located on the front side in the advancing direction to the torque instruction value for the running control section 16R (or 16F) corresponding to the wheels 19R, 19R (or 19F, 19F) located on the rear side in the advancing direction is 4 to 6 for acceleration, 6 to 4 for deceleration, and 5 to 5 for uniform speed running. The allocation ratio of the torque values need not be fixed but may be varied on the basis of a rotation speed from the encoder 17F or 17R.

Before the guided vehicle 1 starts running, the controller 10 of the guided vehicle 1 creates a running program for the destination and determines the ratio of the torque instruction values outputted to the running control sections 16F, 16R, respectively. Then, the determining means compares the magnitudes of the two torque instruction values with each other. The comparing means then determines that the torque instruction value for the running control section 16R (16F) corresponding to the wheels 19R, 19R (or 19F, 19F) located on the rear side in the moving direction is larger than the torque instruction value for the running control section 16F (16R) corresponding to the wheels 19F, 19F (or 19R, 19R) located on the front side in the moving direction. Then, the switching means switches the encoder having the measured data referenced, to the encoder 17R (or 17F) corresponding to the wheels 19R, 19R (or 19F, 19F) located on the rear side in the moving direction.

The guided vehicle 1 starts running and is accelerated until it reaches a predetermined mark member 21 (first mark member 21) on the detected member 20. Then, when the detecting sensor 11 or 12 of the guided vehicle 1 detects the first mark member 21, the torque instruction value for the running control section 16F corresponding to the front wheels 19F, 19F is set equal to the torque instruction value for the running control section 16R corresponding to the rear wheels 19R, 19R. The guided vehicle 1 is then switched to uniform speed running. The uniform speed running is continued until a predetermined mark member 21 (second mark member 21) on the detected member 20 is reached. During acceleration and uniform speed running, the controller 10 of the guided vehicle 1 measures the moving speed or distance by referencing the encoder 17R (or 17F) corresponding to the wheels 19R, 19R (or 19E, 19E) located on the rear side in the moving direction. When the detecting sensor 11 or 12 detects the second mark member 21, the ratio of the torque instruction value outputted to the running control section 16F to the torque instruction value outputted to the running control section 16R is changed. Then, the comparing means determines that the torque instruction value for the running control section 16F (16R) corresponding to the wheels 19F, 19F (or 19R, 19R) located on the front side in the moving direction is larger than the torque instruction value for the running control section 16R (16F) corresponding to the wheels 19R, 19R (or 19F, 19F) located on the rear side in the moving direction. Then, the switching means switches the encoder having the measured data referenced, to the encoder 17F (or 17R) corresponding to the wheels 19F, 19F (or 19R, 19R) located on the front side in the moving direction. Thus, during deceleration, the controller 10 of the guided vehicle 1 measures the moving speed or distance by referencing the encoder 17F (or 17R) corresponding to the wheels 19F, 19F (or 19R or 19R) located on the front side in the moving direction. The deceleration of the guided vehicle 1 is controlled so that the detecting sensor 11 or 12 counts the mark members 21, 21, . . . so that the about-to-stop speed is reached at the mark member 21 located immediately in front of the stop target position. At the about-to-stop speed, the guided vehicle 1 can be immediately stopped at any time. The guided vehicle 1 is controlled to use the encoder 17F (17R) corresponding to the wheels 19F, 19F (or 19R or 19R) located on the front side in the moving direction to measure the moving distance at small increments (for example, 0.01 [mm] increments) starting with the mark position on the mark member 21 located immediately in front of the stop target position, before precisely stopping at the stop target position.

With the above configuration, the encoder having the measured data referenced is switched to the encoder 17F/17R corresponding to the running control section 16F/16R to which the larger torque instruction value is allocated, on the basis of the magnitudes of the torque instruction values outputted by the controller 10 to the running control sections 16F, 16R. However, the switching control of the encoder 17F/17R is not limited to this arrangement. The controller 10, control means, may be provided with determining means for determining that the guided vehicle is being accelerated if a variation in rotation speed per unit time is positive, while determining that the guided vehicle is being decelerated if a variation in rotation speed per unit time is negative. If the determining means determines that the guided vehicle is being accelerated, the encoder having the measured data referenced may be switched to the encoder 17R (or 17F) corresponding to the wheels 19R, 19R (or 19E, 19E) located on the rear side in the moving direction. If the determining means determines that the guided vehicle is being decelerated, the encoder having the measured data referenced may be switched to the encoder 17R (17F) corresponding to the wheels 19F, 19F (or 19R, 19R) located on the front side in the moving direction.

In the above configuration, the controller 10 of the guided vehicle 1 more accurately measures the moving speed or distance by switching to the encoder 17F/17R corresponding to the wheels 19F, 19F or 19R, 19R which are unlikely to slip, depending on the acceleration/deceleration of the guided vehicle 1. This makes the system more reliable.

In the present embodiment, the guided vehicle 1 can roughly measure the moving distance by using the detecting sensor 11 or 12 to detect the mark members 21, 21, . . . of the detected member 20. The controller 10 can also calculate the moving distance during running by summing the rotation speeds referenced by the encoders 17F, 17R, respectively. The difference between the calculated moving distance and the actual moving distance is relatively small. Therefore, the controller 10 can also accurately measure the moving distance.

An automated guided vehicle system is known which is used in a semiconductor manufacturing plant or the like and which comprises a moving path laid along processing devices or the like and on which an automated guided vehicle automatically runs. The automated guided vehicle conveys work pieces. When the guided vehicle is accelerated or decelerated, a slip is likely to occur between wheels and a floor surface. Such a slip occurs as described below.

While the guided vehicle is being accelerated, a load is shifted toward the rear of the guided vehicle in the advancing direction. A load imposed on wheels located on the front side in the advancing direction relatively decreases, while a load imposed on wheels located on the rear side in the advancing direction relatively increases. That is, in this state, the gravity is applied to the wheels located on the rear side in the advancing direction to cause the wheels located on the front side in the advancing direction to float. Consequently, a slip is prone to occur between the front wheels and the moving path. On the basis of a similar principle, while the guided vehicle is being decelerated, a slip is prone to occur between the rear wheels and the moving path. The slip occurs when the wheels are provided with a turning force exceeding a threshold value for friction (upper limit value for frictional resistance) between the wheels and the moving path. However, the threshold value for friction decreases with the load imposed on the wheels. Focusing on this, the Unexamined Japanese Patent Application Publication (Tokkai) 2001-240213 discloses a technique to prevent a possible slip between the wheels and the moving path to make running more stable.

The guided vehicle disclosed in the Unexamined Japanese Patent Application Publication (Tokkai) 2001-240213 is adapted for a four wheel drive in which two running drive means are provided for a pair of front wheels and a pair of rear wheels, respectively. Each running drive means is switched between speed control and torque control depending on whether the guided vehicle is being accelerated or decelerated. Specifically, during acceleration, torque control is performed by the running drive means for the wheels which are located on the front side in the advancing direction and which has a smaller threshold value for the friction between the wheels and the moving path, while speed control is performed by the running drive means for the wheels located on the rear side in the advancing direction. During deceleration, torque control is performed by the running drive means for the wheels which are located on the rear side in the advancing direction and which has a smaller threshold value for the friction between the wheels and the moving path, while speed control is performed by the running drive means for the wheels located on the front side in the advancing direction. This configuration controls the torque on the wheels that are likely to slip, depending on whether the guided vehicle is being accelerated or decelerated. This prevents a possible slip between the wheels and the floor surface. Further, the same torque value as the value of the torque on the above wheels is outputted to the other running drive means to control the torque on the other wheels.

It is an object of the present invention to provide a moving body such as a guided vehicle or a stacker crane which has a configuration different from that of the Unexamined Japanese Patent Application Publication (Tokkai) 2001-240213 and which prevents a possible slip between its wheels and a moving path, the moving body applying appropriate torques to all wheels under conditions for preventing a possible slip, thus improving an acceleration performance.

A description has been given of the problems to be solved by the present invention. Now, description will be given of means for solving the problems.

First, as set forth in claim 15, there is provided a moving body comprising driving wheels located on a front and rear sides in its moving direction, the moving body further comprising control means for setting a torque on the driving wheels located on the rear side in the moving direction to be larger than a torque on the driving wheels located on the front side in the moving direction while the moving body is being accelerated, and setting a torque on the driving wheels located on the front side in the moving direction to be larger than a torque on the driving wheels located on the rear side in the moving direction while the moving body is being decelerated.

As set forth in claim 16, the torque control means comprises first torque control means for controlling the torque on the driving wheels located on the front side in the moving direction and second torque control means for controlling the torque on the driving wheels located on the rear side in the moving direction.

As set forth in claim 17, the moving body comprises first rotation speed detecting means for detecting a rotation speed of the driving wheels located on the front side in the moving direction, second rotation speed detecting means for detecting a rotation speed of the driving wheels located on the rear side in the moving direction, and comparing means for comparing the rotation speed detected by the first rotation speed detecting means with the rotation speed detected by the second rotation speed detecting means, and the torque on the driving wheels located on the front side in the moving direction and the torque on the driving wheels located on the rear side in the moving direction can be adjusted on the basis of a result of the comparison by the comparing means.

An aspect of the invention set forth in claim 15 produces the effect described below. While the moving body is being accelerated, the gravity is applied to the wheels located on the rear side in the moving direction to cause the wheels located on the front side in the moving direction to float. Thus, the control means sets the torque on the driving wheels located on the rear side in the moving direction to be larger than the torque on the driving wheels located on the front side in the moving direction. While the moving body is being accelerated, the gravity is applied to the wheels located on the rear side in the moving direction to cause the wheels located on the front side in the moving direction to float. Thus, control means sets the torque on the driving wheels located on the rear side in the moving direction to be larger than the torque on the driving wheels located on the front side in the moving direction. While the moving body is being decelerated, the gravity is applied to the wheels located on the front side in the moving direction to cause the wheels located on the rear side in the moving direction to float. Thus, control means sets the torque on the driving wheels located on the front side in the moving direction to be larger than the torque on the driving wheels located on the rear side in the moving direction. Consequently, this aspect can prevent a possible slip between the wheels of the moving body and the moving path. It can also apply appropriate torques to all the wheels under conditions for preventing a possible slip, thus improving the acceleration performance.

According to an aspect of the invention set forth in claim 16, the control means comprises the first torque control means and the second torque control means. Each torque control means independently controls the corresponding driving wheels. While the moving body is being accelerated, the gravity is applied to the wheels located on the rear side in the moving direction to cause the wheels located on the front side in the moving direction to float. Thus, control means sets the torque on the driving wheels located on the rear side in the moving direction to be larger than the torque on the driving wheels located on the front side in the moving direction. While the moving body is being decelerated, the gravity is applied to the wheels located on the front side in the moving direction to cause the wheels located on the rear side in the moving direction to float. Thus, control means sets the torque on the driving wheels located on the front side in the moving direction to be larger than the torque on the driving wheels located on the rear side in the moving direction. Consequently, this aspect can prevent a possible slip between the wheels of the moving body and the moving path. It can also apply appropriate torques to all the wheels under conditions for preventing a possible slip, thus improving the acceleration performance.

According to an aspect of the invention set forth in claim 17, the control means uses the comparing means to compare the rotation speed detected by the first rotation speed detecting means with the rotation speed detected by the second rotation speed detecting means. On the basis of the result of the comparison by the comparing means, the control means can adjust the torque on the driving wheels located on the front side in the moving direction and the torque on the driving wheels located on the rear side in the moving direction. This enables feedback control to be performed to eliminate a slip. Therefore, under conditions for preventing a possible slip, more appropriate torques can be applied to all the wheels, thus improving the acceleration performance.

Figure 14:
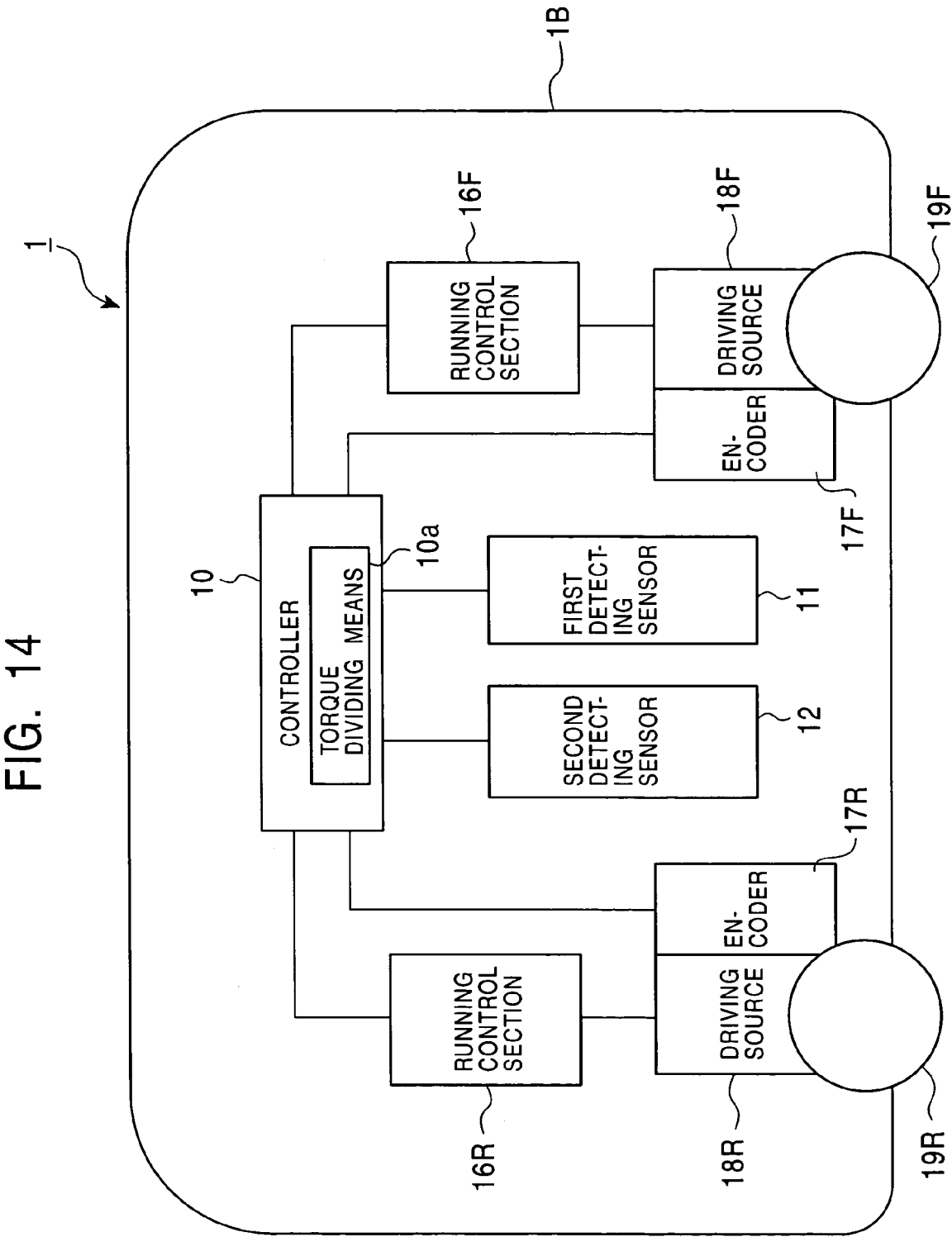
FIG. 14 is a block diagram showing a control arrangement for the guided vehicle.

FIG. 14 shows a control arrangement for the guided vehicle 1. The guided vehicle 1 is provided with the controller 10 that controls its running and the transfer of work pieces. The controller 10 connects communicatively to the running control section 16F that controls the driving source 18F for the front wheels 19F, 19F and the running control section 16R that controls the driving source 18R for the rear wheels 19R, 19R. The encoders 17F, 17R are attached to the driving shafts of the driving sources 18F, 18R, respectively, to measure the distance that the guided vehicle 1 has moved. The encoders 17F, 17R are communicatively connected to the controller 10.

While the guided vehicle 1 is moving, both encoders 17F, 17R, rotation speed detecting means, detect the rotation speeds of the wheels 19F, 19F, 19R, 19R. Further, the controller 10, control means, references a detected value from the encoder 17R (or 17F) of the driving source 18R (or 18F) of the wheels 19R, 19R (or 19F, 19F) located on the rear side relative to the advancing direction when the guided vehicle 1 is accelerated or runs at a uniform speed. The controller 10 references a detected value from the encoder 17F (or 17R) of the driving source 18F (or 18R) of the wheels 19F, 19F (or 19R, 19R) located on the front side relative to the advancing direction when the guided vehicle 1 is decelerated.

In the present embodiment, during movement at a uniform speed, the controller 10 determines the moving speed or distance on the basis of the measured value from the encoder 17R (or 17F) of the driving source 18R (or 18F) of the wheels 19R, 19R (or 19F, 19F) located on the rear side in the advancing direction. However, the controller 10 may be configured to determine the moving speed or distance on the basis of the measured value from the encoder 17F (or 17R) of the driving source 18F (or 18R) of the wheels 19F, 19F (or 19R, 19R) located on the rear side in the advancing direction. In this configuration, the controller 10 switches to the encoder 17F/17R corresponding to the wheels 19F, 19F or 19R, 19R that are unlikely to slip, depending on whether the guided vehicle 1 is being accelerated or decelerated. Thus, the controller 10 can more accurately measure the moving speed or distance, thus making the guided vehicle more reliable.

Now, a description will be given of the torque control of the front wheels 19F, 19F and rear wheels 19R, 19R. When a destination (processing device 4 or the like) is specified, a running program in which timings for acceleration and deceleration and the like are written is created for the guided vehicle 1. Then, the running of the guided vehicle 1 is controlled in accordance with the running program. The controller 10 roughly determines the moved position by using the detecting sensor 11 or 12 to detect the mark members 21, 21, . . . of the detected member 20. The controller 10 switches a running state between acceleration and deceleration and uniform speed running by detecting the mark member 21 specified by the running program.

Figure 15:
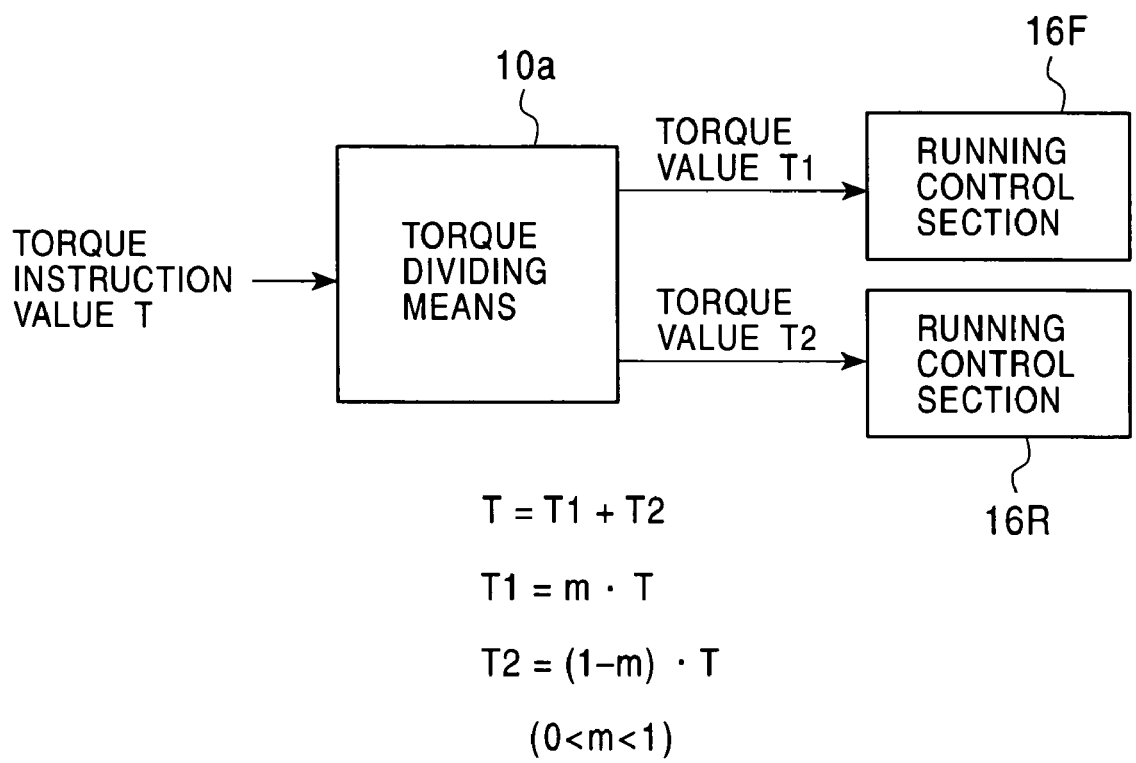
FIG. 15 is a block diagram showing a control arrangement for torque dividing means.

As shown in FIGS. 14 and 15, the controller 10, control means, comprises torque dividing means 10*a* that operates when a torque instruction value T created by the controller 10 is inputted to the controller 10, to divide the torque instruction value T into a torque value (first torque value) T1 that drives the front wheels 19F, 19F and a torque value (second torque value) T2 that drives the rear wheels 19R, 19R, depending on whether the guided vehicle 1 is being accelerated or decelerated or is running at a uniform speed.

The torque instruction value T is the sum of the first torque value T1 and second torque value T2 (T=T1+T2). Here, provided that a coefficient is defined as m, the first torque value T1 is expressed as T1=m·T, and the second torque value T2 is expressed as T2=(1−m)·T. The torque dividing means 10*a* outputs the first torque value T1 to the running control section 16F and the second torque value T2 to the running control section 16R. Each running control section 16F (16R), torque control means, controls the torque on the driving source 18F (18R) on the basis of the torque value T1 (T2).

The torque instruction value T is divided so as to minimize the possibility of a slip between the wheels 19F, 19F or 19R, 19R and the running rails 2, 2. Specifically, when the guided vehicle 1 is accelerated, the torque value T2 (or T1) for the running control section 16R (or 16F) corresponding to the wheels 19R, 19R (or 19F, 19F) which are located on the rear side in the advancing direction and to which the gravity is applied is set to be larger than the torque value T1 (or T2) for the running control section 16F (or 16R) corresponding to the wheels 19F, 19F (or 19R, 19R) located on the front side in the advancing direction. When the guided vehicle 1 is decelerated, the torque value T1 (or T2) for the running control section 16F (or 16R) corresponding to the wheels 19F, 19F (or 19R, 19R) which are located on the front side in the advancing direction and to which the gravity is applied is set to be larger than the torque value T2 (or T1) for the running control section 16R (or 16F) corresponding to the wheels 19R, 19R (or 19F, 19F) located on the rear side in the advancing direction. When the guided vehicle 1 runs at a uniform speed, the torque value T1 for the running control section 16F corresponding to the front wheels 19F, 19F is equal to the torque value T2 for the running control section 16R corresponding to the rear wheels 19R, 19R.

For example, the ratio of the torque value T1 (or T2) for the running control section 16F (or 16R) corresponding to the wheels 19F, 19F (or 19R, 19R) located on the front side in the advancing direction to the torque value T2 (or T1) for the running control section 16R (or 16F) corresponding to the wheels 19R, 19R (or 19F, 19F) located on the rear side in the advancing direction is 4 to 6 for acceleration, 6 to 4 for deceleration, and 5 to 5 for uniform speed running.

While the guided vehicle 1 is being accelerated, the gravity is applied to the wheels 19R, 19R (or 19F, 19F) located on the rear side in the moving direction to cause the wheels 19F, 19F (or 19R, 19R) located on the front side in the moving direction to float. Accordingly, the above configuration sets the torque on the wheels 19R, 19R (or 19F, 19F) located on the rear side in the moving direction to be larger than the torque on the wheels 19F, 19F (or 19R, 19R) located on the front side in the moving direction. While the guided vehicle 1 is being decelerated, the gravity is applied to the wheels 19F, 19F (or 19R, 19R) located on the front side in the moving direction to cause the wheels 19R, 19R (or 19F, 19F) located on the rear side in the moving direction to float. Accordingly, the above configuration sets the torque on the wheels 19F, 19F (or 19R, 19R) located on the front side in the moving direction to be larger than the torque on the wheels 19R, 19R (or 19F, 19F) located on the rear side in the moving direction. It is thus possible to prevent a possible slip between the wheels 19F, 19F (or 19R, 19R) and the running rails 2, 2. Further, under conditions for preventing a possible slip, appropriate torques can be applied to all the wheels, thus improving the acceleration performance.

As previously described, the ratio of the torque value T1 to the torque value T2 may be switched among the three set values depending on the three statuses, that is, acceleration, deceleration, and uniform speed running. Alternatively, the ratio may be varied on the basis of the rotation speed from the encoders 17F or 17R during acceleration or deceleration.

If the torque values T1, T2 are varied during acceleration or deceleration, the controller 10, control means, is provided with comparing means for comparing the rotation speed detected by the encoder 17F with the rotation speed detected by the encoder 17R. In this case, on the basis of the result of the comparison by the comparing means, the controller 10 can adjust the torque on the wheels 19F, 19F (or 19R, 19R) located on the front side in the moving direction and the torque on the wheels 19R, 19R (or 19F, 19F) located on the rear side in the moving direction. That is, the coefficient (m) is used as a variable varied on the basis of the rotation speed from the encoder 17F or 17R. Control is thus performed so as to set the appropriate torque values T1, T2.

Specifically, if the guided vehicle 1 is running from rear wheel 19R, 19R side toward front wheel 19F, 19F side and is being accelerated, the coefficient (m) varies within the range of 0.5<m<1. It is assumed that while the guided vehicle 1 is being accelerated, the determining means of the controller 10 determines that the measured value (rotation value) from the encoder 17F, which detects the rotation speed of the front wheels 19F, 19F, is higher than that from the encoder 17R, which detects the rotation speed of the front wheels 19R, 19R. Then, the controller 10 gradually reduces the value of the coefficient (m) with in the above range (0.5<m<1) in accordance with the difference between the measured values. The first torque value T1 (=m·T) is gradually reduced, while the second torque value T2 (=(1−m)·T) is gradually increased. That is, in this state, there is a high possibility of the front wheels 19F, 19F slipping on the running rails 2, 2. The first torque value T1 is reduced with the second torque value T2 increased to reduce the difference between the rotation speed detected by the encoder 17F and the rotation speed detected by the encoder 17R. In other words, the slip of the front wheels 19F, 19F is gradually eliminated by reducing the torque applied to the front wheels 19F, 19F, while increasing the torque applied to the rear wheels 19R, 19R. Consequently, the guided vehicle 1 can run stably without slipping.

It is assumed that if the guided vehicle 1 is running from rear wheel 19R, 19R side toward front wheel 19F, 19F side and is being accelerated, the determining means of the controller 10 determines that the measured value (rotation value) from the encoder 17R, which detects the rotation speed of the rear wheels 19R, 19R, is higher than that from the encoder 17F, which detects the rotation speed of the front wheels 19F, 19F. Then, the controller 10 gradually increases the value of the coefficient m within the above range (0.5<m<1) in accordance with the difference between the measured values. The first torque value T1 (=m·T) is gradually increased, while the second torque value T2(=(1−m)·T) is gradually reduced. That is, in this state, there is a high possibility of the rear wheels 19R, 19R slipping on the running rails 2, 2. The first torque value T1 is increased with the second torque value T2 reduced to reduce the difference between the rotation speed detected by the encoder 17F and the rotation speed detected by the encoder 17R. In other words, the slip of the rear wheels 19R, 19R is gradually eliminated by increasing the torque applied to the front wheels 19F, 19F, while reducing the torque applied to the rear wheels 19R, 19R. Consequently, the guided vehicle 1 can run stably without slipping.

If the guided vehicle 1 is running from rear wheel 19R, 19R side toward front wheel 19F, 19F side and is being decelerated, the coefficient m varies within the range of 0<m<0.5. It is assumed that while the guided vehicle 1 is being decelerated, the determining means of the controller 10 determines that the measured value (rotation value) from the encoder 17F, which detects the rotation speed of the front wheels 19F, 19F, is higher than that from the encoder 17R, which detects the rotation speed of the front wheels 19R, 19R. Then, the controller 10 gradually reduces the value of the coefficient m within the above range (0<m<0.5) in accordance with the difference between the measured values. The first torque value T1 (=m·T) is gradually reduced, while second torque value T2 (=(1−m)·T) is gradually increased. That is, in this state, there is a high possibility of the front wheels 19F, 19F slipping on the running rails 2, 2. The first torque value T1 is reduced with the second torque value T2 increased to reduce the difference between the rotation speed detected by the encoder 17F and the rotation speed detected by the encoder 17R. In other words, the slip of the front wheels 19F, 19F is gradually eliminated by reducing the torque applied to the front wheels 19F, 19F, while increasing the torque applied to the rear wheels 19R, 19R. Consequently, the guided vehicle 1 can run stably without slipping.

It is assumed that if the guided vehicle 1 is running from rear wheel 19R, 19R side toward front wheel 19F, 19F side and is being decelerated, the determining means of the controller 10 determines that the measured value (rotation value) from the encoder 17R, which detects the rotation speed of the rear wheels 19R, 19R, is higher than that from the encoder 17F, which detects the rotation speed of the front wheels 19F, 19F. Then, the controller 10 gradually increases the value of the coefficient m within the above range (0.5<m<1) in accordance with the difference between the measured values. The first torque value T1(=m·T) is gradually increased, while the second torque value T2(=(1−m)·T) is gradually reduced. That is, in this state, there is high possibility of the rear wheels 19R slipping on the running rails 2, 2. The first torque value T1 is increased with the second torque value T2 reduced to reduce the difference between the rotation speed detected by the encoder 17F and the rotation speed detected by the encoder 17R. In other words, the slip of the rear wheels 19R, 19R is gradually eliminated by increasing the torque applied to the front wheels 19F, 19F, while reducing the torque applied to the rear wheels 19R, 19R. Consequently, the guided vehicle 1 can run stably without slipping.

A description has been given of the adjustment of the torque values T1, T2 made if the guided vehicle 1 is running from rear wheel 19R, 19R side toward front wheel 19F, 19F side. However, the torque values T1, T2 are similarly adjusted if the guided vehicle 1 is running from front wheel 19F, 19F side toward rear wheel 19R, 19R side.

With the above configuration, during acceleration or deceleration, feedback control is performed to eliminate a slip. Under conditions for preventing a possible slip, more appropriate torques can be applied to all the wheels 19F, 19F and 191, 19R of the guided wheel.

The invention claimed is:

1. A moving body system comprising:
    a moving body and a detected member, said moving body moving along a moving path, and said detected member being laid along the moving path,
    wherein said detected member comprises a plurality of mark members in a direction in which the moving body moves,
    wherein the moving body comprises detecting means for detecting the mark members of the detected member,
    wherein each of said mark members comprises a detected portion that can be detected by said detecting means and a non-detected portion that is not detected by said detecting means, and
    wherein addresses are assigned to each of said detected portions and non-detected portions.

2. The moving body system according to claim 1, wherein said detected member is configured like comb teeth in which a comb tooth portion is the detected portion, while a void between the comb teeth is the non-detected portion.

3. The moving body system according to claim 1, wherein in the moving direction of the moving body, the width of said detected portion is equal to the width of said non-detected portion.

4. The moving body system according to claim 1, wherein said detecting means comprises first detecting means and second detecting means which are arranged in the moving direction of the moving body.

5. The moving body system according to claim 4, wherein a spacing W between said first detecting means and said second detecting means and the width D of the detected portion of said detected member in the moving direction of the moving body are configured in accordance with the following relation: $W=(2n+1/2) D$ (n=0, 1, 2, . . .).

6. The moving body system according to claim 1, further comprising a plurality of sensed members arranged in parallel along the moving path of said moving body and in that the moving body is provided with sensing means for sensing the sensed members.

7. The moving body system according to claim 6, wherein each of said sensed members has positional information, and said sensing means is configured to read the positional information from the sensed members.

8. The moving body system according to claim 1, wherein said moving body comprises:

an encoder that measures a moved distance, and control means for controlling a moving speed of the moving body until the mark member located immediately in front of a stop target position is reached, by using said detecting means to detect the mark members of the detected member to determine a moved position of the moving body, and then using the encoder to measure the moved distance of the moving body from the mark member located immediately in front of the stop target position before stopping the moving body at the stop target position.

9. The moving body system according to claim 8, wherein said control means resets the measurement of the moved distance by said encoder to an origin every time said detecting means detects a detection point on the mark member of said detected member.

* * * * *